United States Patent [19]
Toumani et al.

[11] Patent Number: 5,764,727
[45] Date of Patent: Jun. 9, 1998

[54] METALLIC ACCESS TEST EXTENDER

[75] Inventors: Rouben Toumani, Morgan Hill; Georg Arnold, Mountain View; Brad T. Darnell, San Jose, all of Calif.

[73] Assignee: Wiltron Company, Morgan Hill, Calif.

[21] Appl. No.: 652,851

[22] Filed: May 23, 1996

[51] Int. Cl.$^6$ .................. H04M 1/24; H04J 1/16
[52] U.S. Cl. ............... 379/27; 379/29; 379/22; 379/5; 370/244; 370/250
[58] Field of Search ............... 379/3, 5, 22, 24, 379/26, 27, 29, 30, 399, 400, 402; 370/242, 244, 250, 251, 252; 324/522, 523, 525, 527, 533

[56] References Cited

U.S. PATENT DOCUMENTS

| | | |
|---|---|---|
| 4,270,030 | 5/1981 | Brolin et al. .................. 370/250 |
| 4,961,218 | 10/1990 | Kiko . |
| 5,054,050 | 10/1991 | Bruke et al. .................. 379/27 |
| 5,111,497 | 5/1992 | Bliven et al. .................. 379/27 |
| 5,202,919 | 4/1993 | Kiko . |
| 5,361,293 | 11/1994 | Czerwiec .................. 379/27 |
| 5,457,743 | 10/1995 | Kiko . |

OTHER PUBLICATIONS

"Tollgrade MCU-4496, Issue 3B, List 1, SLF-96 Metallic Channel Unit for MLT (Digital By-Pass Pair)" data sheet, Tollgrade Communications Inc., Sep. 1993.
"Transmission DCU Turbo 2000," data sheet, Keptel, Inc.

*Primary Examiner*—Curtis Kuntz
*Assistant Examiner*—Paul Loomis
*Attorney, Agent, or Firm*—Fliesler, Dubb, Meyer & Lovejoy

[57] ABSTRACT

A metallic access test extender includes an office unit and a remote unit coupled to the office unit via a digital transmission system. A voltage controlled current source is included in the office unit and a voltage controlled voltage source in the remote unit. The voltage controlled current source is responsive to the voltage and current sensed at the remote unit load, and the voltage controlled voltage source is responsive to the voltage and current sensed at the input to the office unit. A shunt admittance which has a high impedance at DC and low frequencies is coupled to the office unit load.

50 Claims, 32 Drawing Sheets

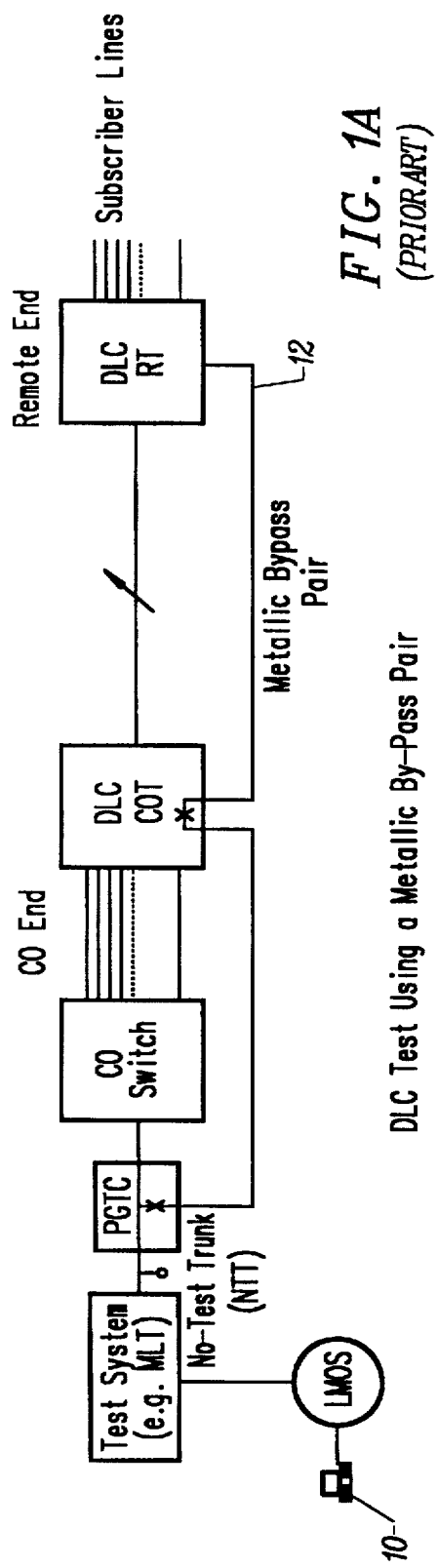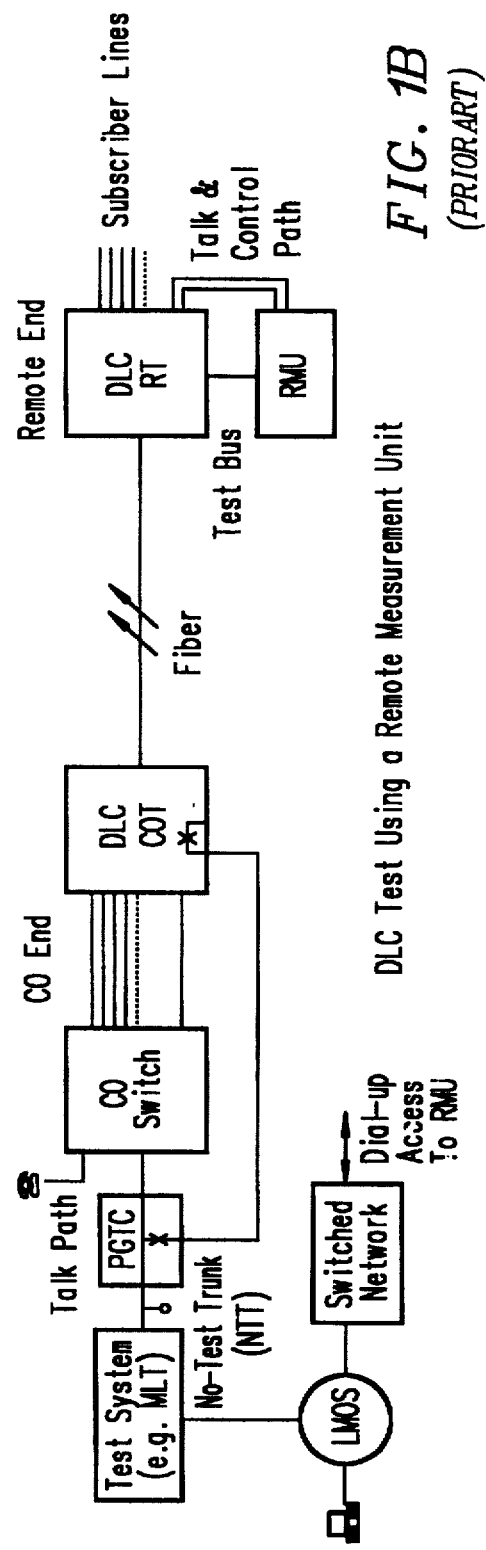
FIG. 1A (PRIOR ART) — DLC Test Using a Metallic By-Pass Pair
FIG. 1B (PRIOR ART) — DLC Test Using a Remote Measurement Unit DLC Test Architecture for Special Services

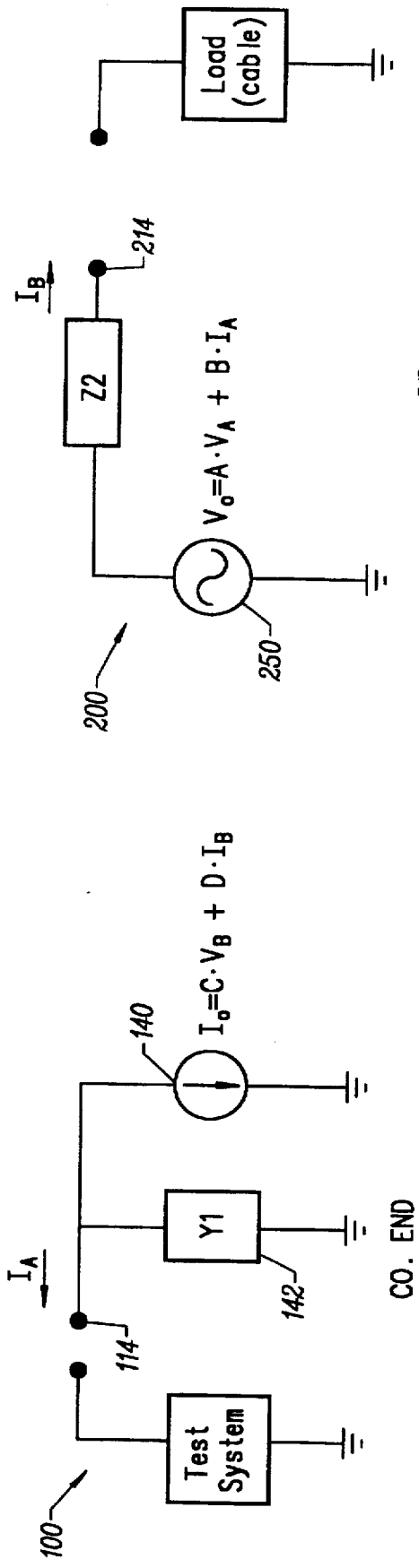
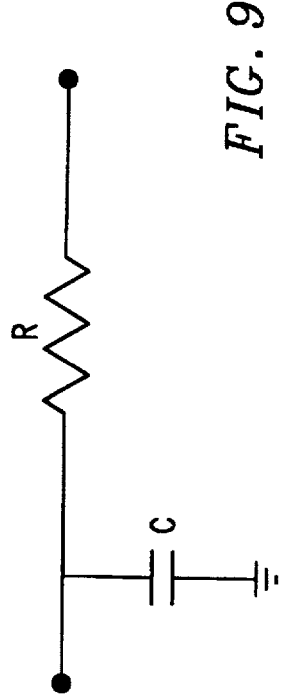
FIG. 8B
FIG. 8A
FIG. 9

```
        ┌─FRAMING
        │        (C₁)       (C₂)       (C₃)
      1 TRTRTR  C TRTRTR  C TRTRTR  C TRTRTR
 t    1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      1 TRTRTR  C TRTRTR  C TRTRTR  C TRTRTR
      0 TRTRTR  C TRTRTR  C TRTRTR  C TRTRTR
        ▷        ▷          ▷          ▷
       FRAME    CONTROL 1  CONTROL 2  CONTROL 3
       TX RDY   TX RDY     TX RDY     TX RDY

FRAME    CONTROL    TIP DC     RING DC
       RX RDY   RX RDY     RX RDY     RX RDY
```

*FIG. 21*

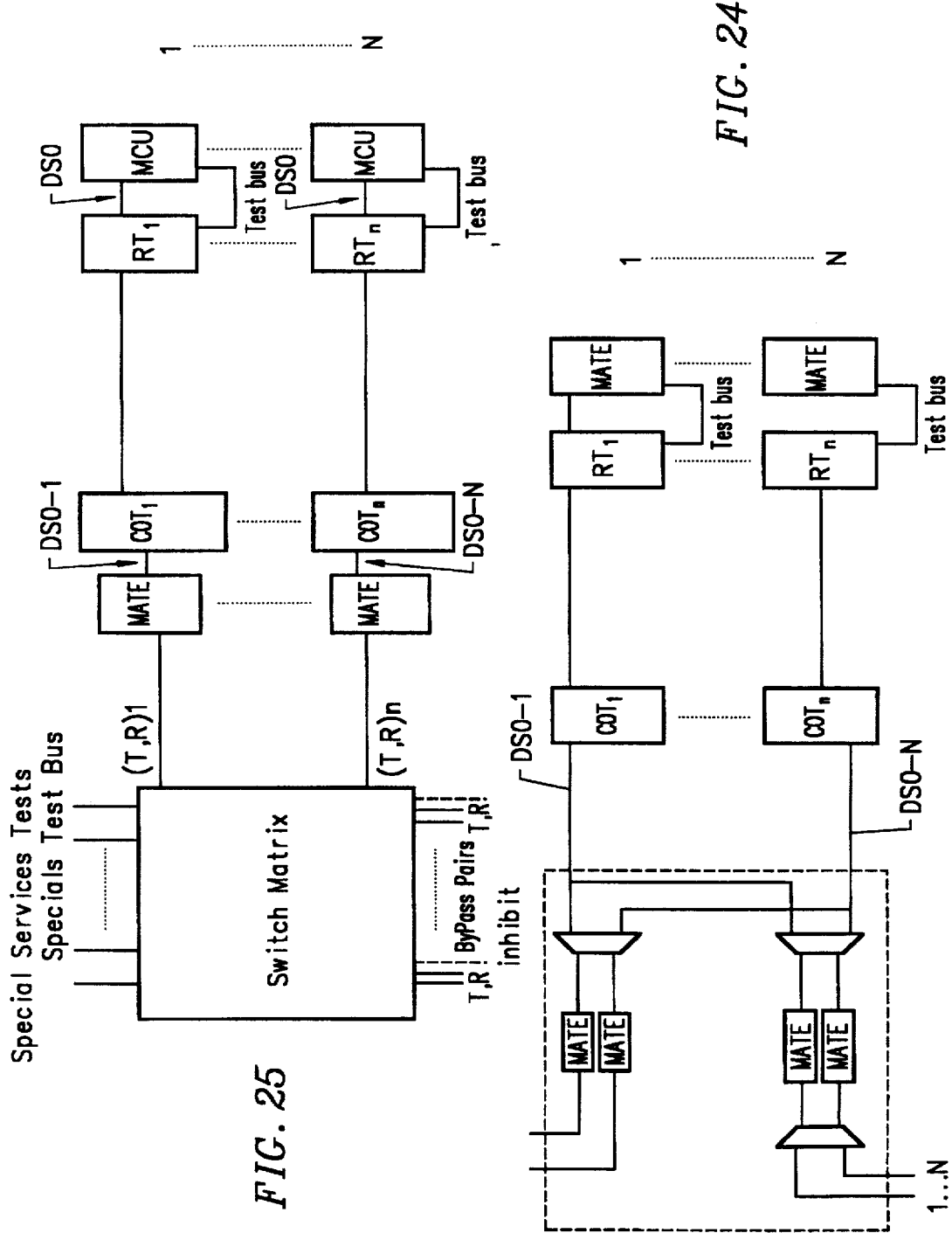

METALLIC ACCESS TEST EXTENDER

CROSS-REFERENCE TO RELATED APPLICATIONS

Co-pending patent application entitled DELTA MODULATOR, Ser. No. 08/652,852, Inventors Brad T. Darnell, Rouben Toumani and Paul Bauer, filed concurrently herewith.

This application is hereby specifically incorporated by reference into the present application.

BACKGROUND OF THE INVENTION

1. Field of the Invention

The invention relates to the extension of a metallic pair connection via a digital transport path.

2. Description of the Related Art

The traditional telecommunication system was comprised of a twisted pair of copper wires which ran from the central office of a telephone company at a particular location to the individual subscriber's home or office. With the advent of digital transmission systems, such as fiber optic networks, the central offices were themselves connected by fiber optic cables, and later, digitally coupled to remote terminals which were placed closer to subscriber drops so that the higher bandwidth digital transmission system could be extended closer to the subscriber's home. More recently, the wire pairs between the central office and remote terminals are being replaced by high bandwidth fiber optic transmission systems. The metallic pair connections are still the dominant means of interconnecting a subscriber's home or office with the remote terminal and its digital link to the central office.

Under certain circumstances, it is necessary to require the digital transmission system to emulate a true metallic pair connection extending between the central office and the remote terminal. One of the most important reasons is to allow test equipment, positioned in the central office, to remotely test subscriber connections extending from the remote terminal.

A number of different schemes have been implemented in order to allow for testing or connection of metallic pairs across the digital transmission system.

FIG. 1A shows a first prior art alternative for testing subscriber lines at the remote end of one type of digital transmission system, a Digital Loop Carrier (DLC) system. As shown in FIG. 1, a typical DLC system includes the Central Office Terminal (COT) and a central office switch at the central office end of the digital transmission system connection. At the remote end of the connection, a digital loop carrier Remote Terminal (RT) is coupled by, for example, a fiber link or high frequency cable to the COT, and to subscriber lines comprising a plurality of metallic pairs (which, for historical reasons, are referred to as "Tip" and "Ring" connections). The central office switch at the CO end is coupled to a pair gain test controller (PGTC) unit, manufactured by Lucent Technologies, Inc. (formerly AT&T Technologies, Inc.), a well-known apparatus for testing the customer's cable pair extension or drop beyond the transmission system's remote terminal (RT).

The PGTC acts as an interface between the DLC systems and loop testing systems. The PGTC allows the use of conventional cable pair loop testing methods on the subscriber lines beyond the remote terminal, provides for testing of a customer's carrier channel equipment, including both transmission performance and signalling performance, and provides compatibility with automated test systems, such as the Mechanized Loop Testing (MLT) system (also manufactured by Lucent Technologies, Inc.). The PGTC therefore minimizes the loop testing equipment needed per carrier system. In operation, the PGTC will be coupled to a test system such as MLT, which is itself controlled by, for example, a Loop Maintenance Operations System (LMOS).

In FIG. 1A, a physical metallic bypass pair 12 is coupled between the central office terminal and remote terminal. The metallic bypass pair is coupled through the central office terminal to the tester trunk of the PGTC unit, and may be switched at the central office and remote terminal to connect with any of the subscriber lines at the remote unit. The advantage of the metallic bypass pair is that no additional test equipment, beyond the PGTC, is required to conduct testing at the remote end. However, the metallic bypass pair is not available with the fiber optic plant; that is, a separate line must be run from the COT to the RT. Secondly, when using the PGTC, one is limited to testing of "Plain Old Telephone Service" (POTS) lines only.

Other types of "special" service lines may also be provided by the telecommunication system. Such special services may comprise, for example, special rate tariff lines, data lines, and PBX lines. Test systems used for special services testing are different from the POTS test systems. The tests applied to special services circuits are more extensive and have separate databases from those used for POTS testing.

A second alternative to remote testing of subscriber lines is shown in FIG. 1B. In FIG. 1B, a Remote Measurement Unit (RMU) is utilized. In this system, an RMU conducts all testing at the remote end. The remote terminal of the digital loop carrier includes a test bus, and a talk and control path which are coupled to the RMU. The RMU is controlled by the LMOS via a dial-up connection. Although the DC bypass pair is eliminated in this embodiment, this system is rather slow, requiring a proprietary LMOS interface, and only allows for POTS testing.

A third alternative is the use of metallic channel emulation equipment, coupled at the central office to similar emulation equipment situated at the remote terminals. This equipment emulates a metallic pair connection between the test systems coupled to bypass pairs in the central office and corresponding bypass pairs at remote terminal over the DLC. One such emulation unit is the Tollgrade MCU 4496 metallic channel unit manufactured by Tollgrade Communications, Inc., Wilmington, Del. The essential principles of the metallic channel unit are described in U.S. Pat. No. 5,457,743 entitled "Metallic Channel Unit Network," Inventor Frederick Kiko, which is a continuation-in-part of U.S. Pat. No. 5,202,919, entitled "Metallic Channel Unit Network," inventor Frederick J. Kiko.

A block level representation of this test system architecture is shown in FIG. 1C. As shown therein, the MCU unit is coupled to the PGTC by the Channel Test Unit (CTU) which gives Tip and Ring connections to the metallic channel unit. A corresponding MCU is provided at the remote end of the digital loop carrier and the Tip and Ring connections at the remote end of the system are emulated at the central office end. Hence, the emulated wire pair connection causes a load appearing at the remote end of the system to be connected via a wire pair to the central office end of the system and vice versa.

One disadvantage of the metallic channel unit is that it is specific to the particular digital loop carrier which is being utilized. Each type of DLC has its own proprietary interface for the metallic channel unit. This requires the telephone company to maintain an inventory of multiple types of MCU's. For example, in the MCU 4496 product information sheet (Issue 3B, list 1), the version of the MCU for the AT&T SLC96 DLC is described. In each case, the MCU unit must be integrated into the COT as well as the RT, as illustrated in FIG. 1C. Another disadvantage is that the MCU requires two DS0 digital channels to link the CO end with the remote end.

Another difficulty with the MCU is in the metallic emulation function. FIG. 2 is a reproduction of FIG. 2 of U.S. Pat. No. 5,457,743 (the '743 patent) which shows an equivalent circuit of the MCU. As shown in that patent, the two ends of the tip sine connection are essentially identical in their implementation. The practical difficulty in implementing this system is in balancing the opposite sides of the circuit to make the system appear as a piece of cable with very high DC impedance to ground. This requires extremely accurate gain matching on both sides of the digital loop carrier (the remote end and the central office end). The '743 patent solution therefore requires great precision or careful adjustment of each unit in order for the emulation function system to work properly.

A further disadvantage of the MCU is that it is limited to testing of POTS systems; no provision for testing of special services is made.

As the need exists to test special service lines also, alternatives for meeting this need have been developed. An alternative for testing special services connections is the special services Remote Test Unit (RTU) shown in FIG. 3. A separate RTU and Test System Controller (TSC) are provided for the special services line at the remote end of the system. However, such systems are commercially unattractive because an RTU/TSC must be placed at each remote site where special services are to be implemented. This requires additional cost, and space at the remote terminal site, and the test equipment may be limited to testing special services only.

SUMMARY OF THE INVENTION

In one aspect a metallic access test extender is provided. The system includes an office unit and a remote unit coupled to the office unit via a digital transmission system. A voltage controlled current source is included in the office unit and a voltage controlled voltage source in the remote unit. The voltage controlled current source is responsive to the voltage and current sensed at the remote unit load, and the voltage controlled voltage source is responsive to the voltage and current sensed at the input to the office unit. A shunt admittance is coupled to the office unit load which has a high impedance at DC and low frequencies.

In a further aspect, a metallic access test extension system architecture for a digital transmission system is provided. The digital transmission system includes a local end and a plurality of remote ends, each of said plurality of remote ends including a digital communication path and a metallic test pair connection. The local end includes a corresponding digital communication path and corresponding metallic pair connection. The architecture includes a remote unit coupled to each metallic test pair and digital communication path at each of said plurality of remote ends. The remote unit includes a metallic access test extension module. The architecture further includes a central office unit at the local end of the digital communication path, the local end unit including a metallic test extension module and a switch system, responsive to a control signal, for selectively connecting the digital communication paths and metallic test pairs at the local end to the metallic test extension module in the local end unit.

In a second aspect, the metallic test extension system is adapted for use with multiple types of DLC systems. Each DLC system includes a plurality of metallic bypass pair connections at a local end coupled via digital transmission paths to a corresponding plurality of metallic bypass pair connections at the remote sites. The metallic test extension system includes an office unit and multiple remote units. The office unit includes a voltage controlled current source, a shunt admittance, and signal scaling, combining and processing circuits, the office unit being selectively coupled to any one of the plurality of metallic bypass pair connections at the local end. The remote unit includes a voltage controlled voltage source responsive to voltage and current sensed in the office unit, a series impedance, signal scaling, combining and processing circuits. The remote unit may be coupled to the metallic bypass pair connection at the remote end which itself connects selectively through the remote terminal to one of multiple metallic subscriber pairs.

In a further embodiment, the invention comprises a test system coupled to a digital transmission system, the digital transmission system having a local end, a digital transmission medium, and a remote end, the local end including a metallic bypass pair connection associated with a corresponding metallic bypass pair connection at the remote end. The test system includes a POTS test system, a special services test system, a metallic test extension local end unit module and a metallic test extension remote unit module. The POTS test system is coupled to the plurality of metallic bypass pair lines at the local end. A special services test system is also located at the local end and is coupled to the test extension system. The local end metallic test extension module is coupled to the local end of the digital transmission system, and includes switching means coupled to the POTS test system and the special services test system, for allocating said one of said plurality of remote units to the POTS test system or the special services test system at the local end. Each remote unit is coupled to a metallic bypass pair line at the remote end to which the digital transmission system may connect any of a plurality of metallic pairs connecting to customers. The metallic test extension modules provide a metallic test extension function such that characteristics of a load coupled at the remote end are seen at the central office end.

In accordance with the system described herein, an advantage of the architecture is that one centralized equipment shelf at the central office can serve multiple, for example forty-eight (48), remote terminals out of the individual central office. Various levels of sophistication in testing for a given application may be supported by simply choosing the appropriate type of unit at the remote terminal.

The system provides the further advantage of utilizing the same metallic pair extension unit module equipment for both POTS and special services circuit testing. The architecture of the present invention arbitrates between the POTS and special services test operation systems for contention of the metallic pair extension function between COT and RT in a manner transparent to the test system. Each central office end metallic test extension module can be shared with any one of the remote unit metallic test extension modules, hence requiring fewer metallic test extension modules at the central office end and providing a significant cost advantage. In addition to extending the test bus to the remote terminals through the metallic test extension function, for special services testing, it also provides a control path to the remote terminal site. This control path, in one embodiment of the present invention, shares a single digital DS0 channel with the metallic test extension function. This control path can be used for sending control commands to the metallic test extension remote unit for, as an example, controlling the test configuration in the remote unit.

Yet another advantage of the invention is that the architecture provides a single point of termination and distribution for X.25 communication links coming from the special services test operational system (OS) at the central office. This alleviates the need to have separate X.25 communication links for each remote terminal. A single digital service channel, such as a DS0, is all that is required for each remote terminal unit for metallic test extension of POTS and special services as well as a control path.

The system architecture utilizing the metallic test extension units of the present invention provides several advantages over the existing basic concept of electrical emulation of metallic wires such as that shown in the Tollgrade U.S. Pat. Nos. 5,202,919 and 5,457,743 patents. In a first unique aspect of the system of the present invention, the digital loop carrier appears as a substantially fixed length of cable to the testing systems, substantially independent of transmission delays introduced by the digital loop carrier system. Only a single digital DS0 path is required to carry information to an office unit and the remote unit. In the system embodiment described herein, a DS0 bit transport channel is utilized. However, it should be recognized that applications for data channels having broader bandwidths and interfaces other than a DS0 interface (such as a DS1 interface) can also be considered within the scope of the present invention. Voice transmission can also take place over the same DS0 transport path using essentially the same circuit elements, thereby saving bandwidth. As noted in the product specification for the Tollgrade MCU, two DS0 channels are required. In addition, the architecture and metallic test extension units of the present invention provide a control path between the central office and remote terminal over the same DS0 channel, which can then be used for controlling access to special services circuits through the digital loop carrier system, as well as controlling a variety of other functions such as alarms and diagnostic signals. In a significant advantage over the systems described in the prior art, the system of the present invention relies on standard external interfaces of digital loop carrier systems, such as, for example, a 56 Kbps data port or a DS1 interface. This provides portability for the metallic test extension units of the present invention, and hence the architecture of the present invention, to various DLC systems. Finally, the metallic test extension units when implemented in the architecture of the present invention provide very high impedance at the central office test system interface under open circuit load conditions, without having to resort to excessively precise components such as those described in the Tollgrade patents.

BRIEF DESCRIPTION OF THE DRAWINGS

The system will be described with respect to the particular embodiments thereof. Other objects, features, and advantages of the system will become apparent with reference to the detailed description and drawings in which:

FIGS. 1A-1C are depictions of prior art systems for testing metallic access pairs at a remote end of a digital loop carrier network.

FIGS. 8A and 8B are block level equivalent circuits illustrating the general principle of the metallic test extension function at the office and remote units of the test extension system of the present invention.

FIG. 9 is a schematic diagram of a transmission line equivalent circuit illustrating the principle of the present invention implemented by the architecture of the system of the present invention.

FIG. 21 is an illustration of the data pattern in a 56 Kbps transmission from the office unit to the remote unit.

FIG. 24 is a block diagram illustrating the system of the present invention which, in conjunction with FIG. 25, illustrates a further embodiment of the present invention.

FIG. 25 is an illustration of a further embodiment of the system of the present invention.

DETAILED DESCRIPTION

Described herein is a test system for allowing metallic access pairs at a remote terminal at a digital loop carrier to be tested as if the pairs were connected via a substantially fixed length of copper cable to the central office terminal. The system includes a test architecture which is designed to extend the test capabilities of the central office test systems to remote terminals of digital loop carrier systems for both POTS and special services circuits. In a further aspect, an improved metallic test extension module is provided.

In the following description, numerous details, for example, specific materials, process steps, etc., are set forth in order to provide a thorough understanding of the system. It will be readily understood, however, to one skilled in the art that the specific details need not be employed to practice the present invention. Moreover, details of particular processes or structures may not be specifically presented in order not to unduly obscure the invention where such details would be readily apparent to one of average skill in the art. Overview of the System Architecture of the Present Invention FIGS. 4–8 show an overview of the system architecture for implementing the metallic access test extension system of the present invention.

Figure 1C:
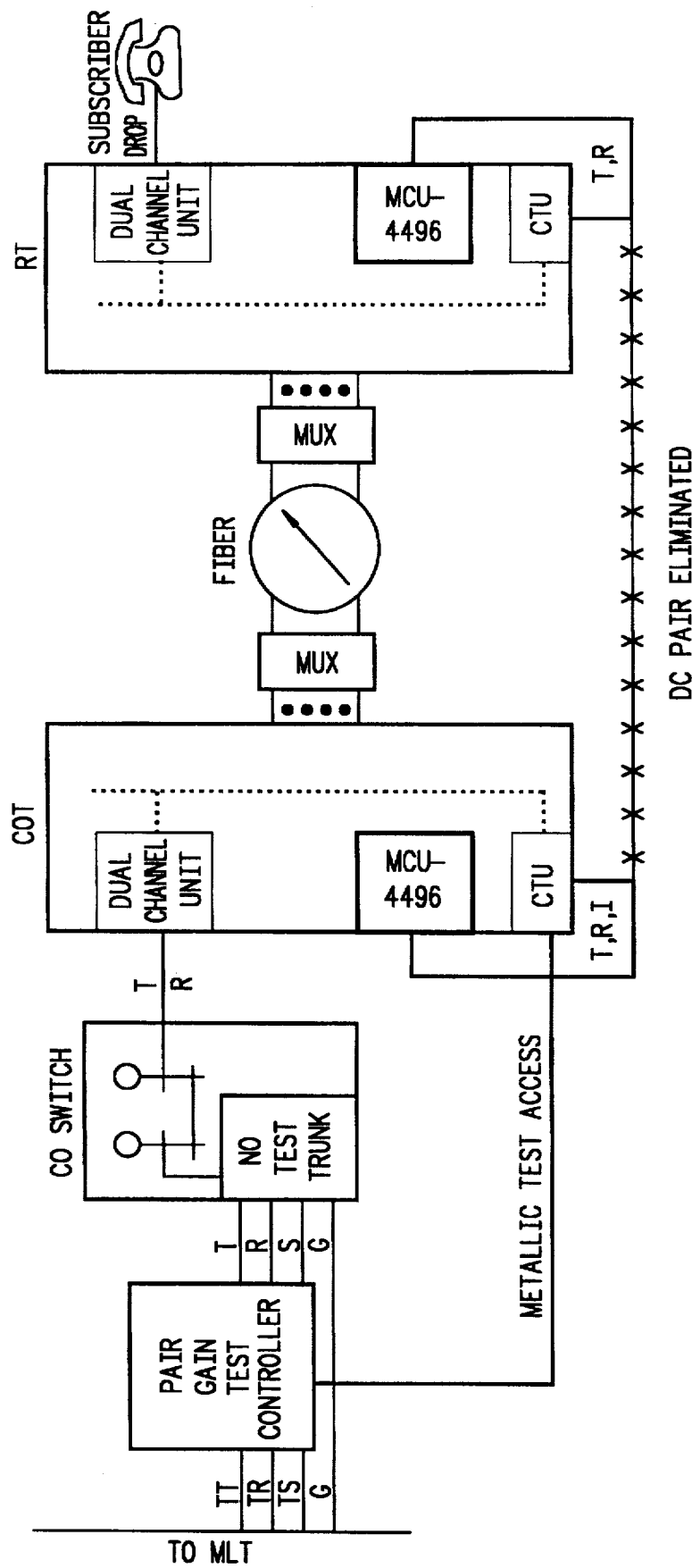
Figure 2:
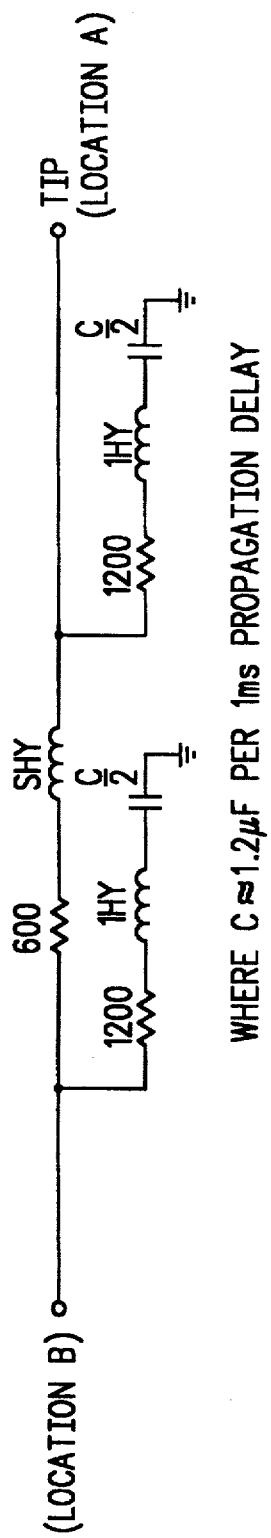
FIG. 2 is the equivalent circuit for the tip terminal connection of a metallic channel unit of the prior art.
Figure 3:
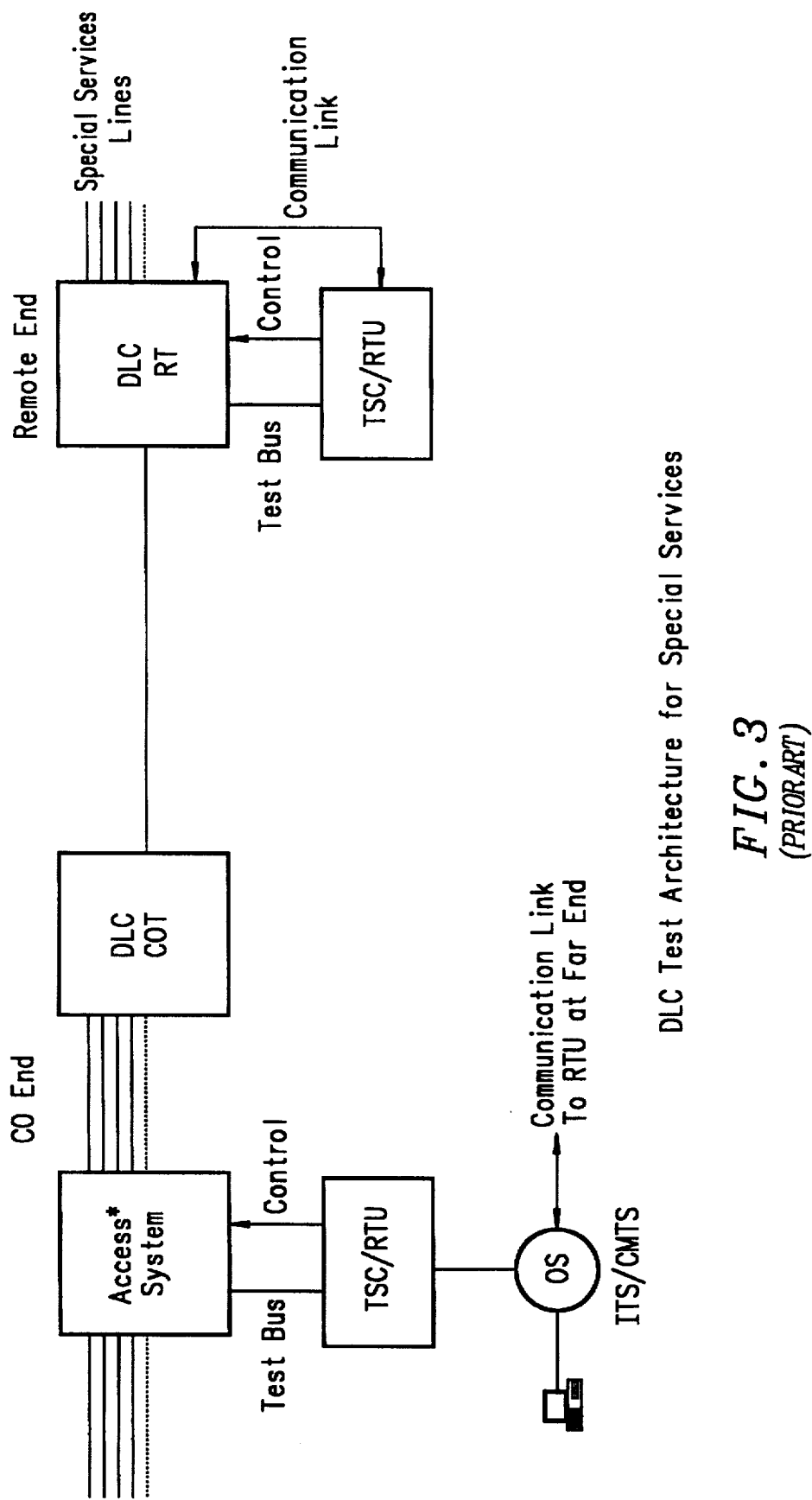
FIG. 3 is a depiction of a prior art system for testing special services lines at a remote end of a digital loop carrier network
Figure 4:
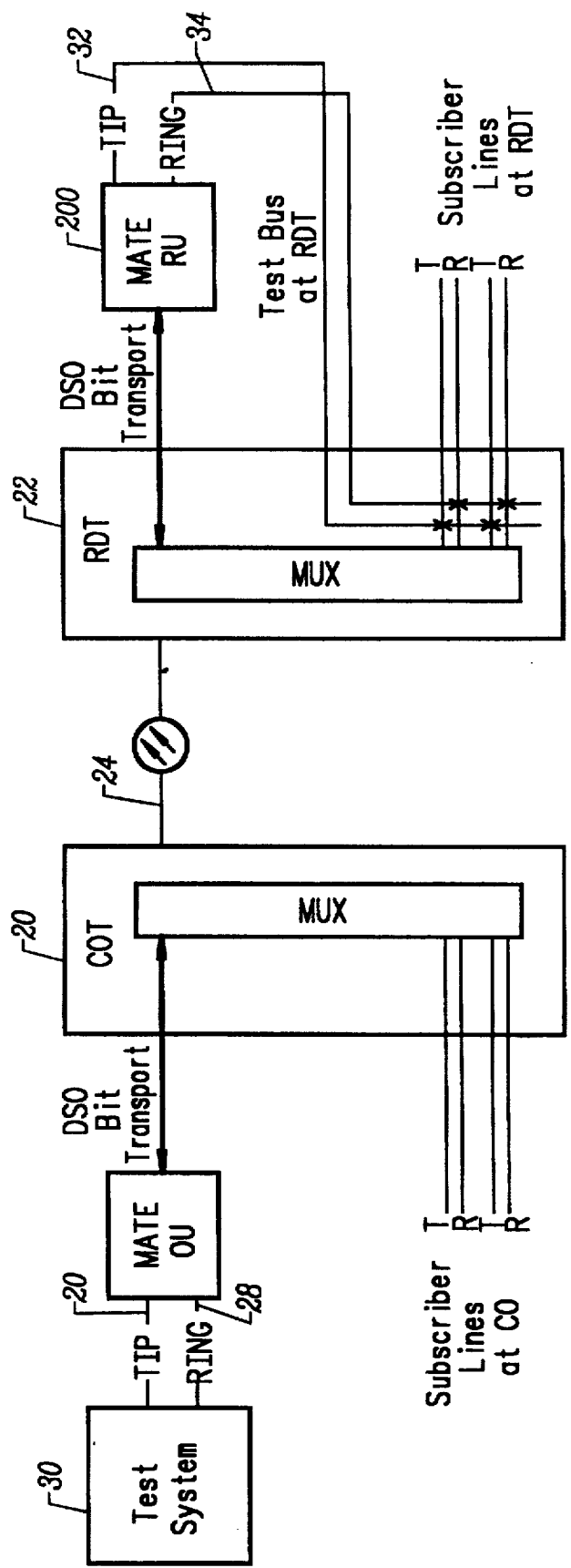
FIG. 4 is a block level diagram illustrating a system architecture for implementing metallic extension testing in accordance with the present invention.

FIG. 4 shows the general concept of the metallic test extension unit in conjunction with a digital transmission system, such as a DLC, in the architecture of the test system of the present invention.

FIG. 4 illustrates a central office terminal 20, and a remote office terminal 22, coupled by a digital bit transport medium 24. While the system of the present invention will be described with respect to a digital loop carrier system, it should be understood that the principles of the invention are applicable to any digital transmission system or medium where test extension functions are required. The Tip line 26 and Ring line 28 form a single metallic test pair, and are coupled directly to a metallic test extension office unit 100. The Tip line 26 and Ring line 28 are coupled to a test system 30. Test system 30 may comprise a POTS or special test system. A metallic test extension remote unit 200 is coupled to Tip line 32 and Ring line 34 at the remote end of the DLC system. The Tip line 32 and Ring line 34 are coupled to a test bus at the DLC system which provides test access to metallic pairs served by the system.

Metallic test extension office unit 100 and remote unit 200 perform somewhat different functions with respect to their interaction with testing systems but have common structural elements to support the metallic test extension of the Tip line and Ring line. The office unit and remote unit are connected via the digital bit transport path 24 provided by the digital loop carrier system. In general, the metallic test extension units function to electronically extend the testing capability of test systems located in the central office terminal to the tip and ring terminals of the metallic test bus on the remote terminal of digital loop carrier systems. The metallic test extension units replace the cable that would, in prior systems, connect the Tip and Ring terminals of the test system at the central office to the Tip and Ring terminals of the test bus at the remote terminal.

The central office equipment metallic test extension office unit 100 occupies a single shelf in a central office environment. The central office unit may comprise up to four metallic test extension modules for POTS testing, and another four metallic test extension modules for special services testing, as shown generally in FIGS. 5–7. The number of special services testing modules, set at four, is completely dependent on the interface to the special services test system. It should be recognized that any number of metallic test extension units may be utilized to control any number of remote units; the selection of four office units for POTS testing is dictated by the prior art test systems, which use the PGTC. Up to twelve remote interface modules (RIM) are utilized in conjunction with individualized metallic test extension modules 102 to implement one embodiment of the architecture in accordance with the present invention. The RIM modules implement switching of the metallic test extension modules, as described below. A power supply/control module 104 is also provided in the office unit 100.

Moreover, the system is designed to be modular, and to have modules with varying degrees of test unit sophistication. The office unit and remote units can be configured into several different levels of testing sophistication, and the various modules can be inserted into the office unit configuration or placed at the remote site. For example, remote units can be configured as POTS only, POTS plus basic special services tests, POTS plus extended special services tests, and POTS with specials tests supported remotely (i.e. shifting more of the test load from the office unit module to the remote unit module).

Figure 5:
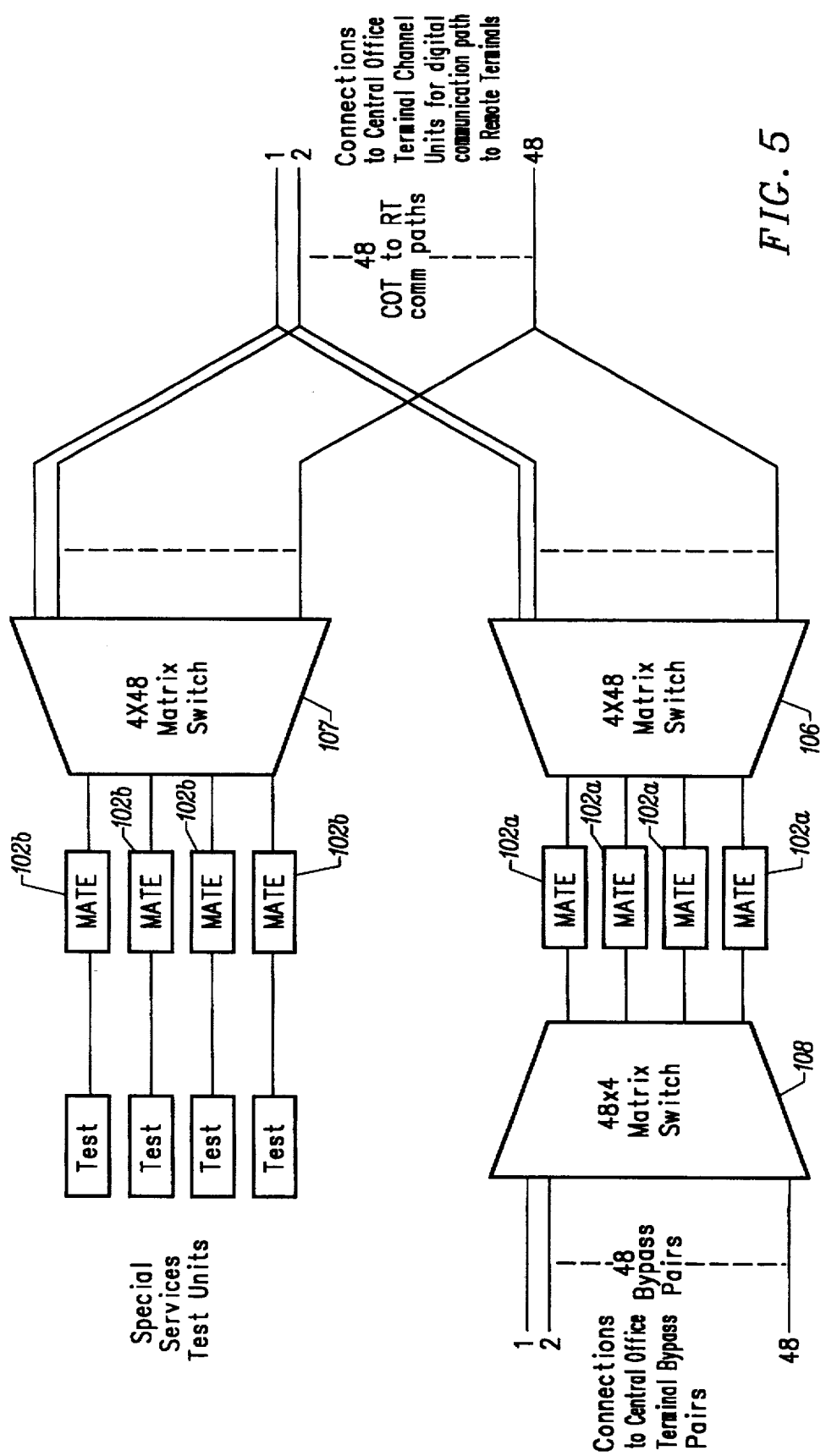
FIG. 5 is a block level diagram illustrating the local end of a system for implementing test systems for both POTS and special services connections, including sharing the metallic test extension function at the local end.

FIG. 5 shows, in general form, the switching configuration and implementation for concentrating metallic test extension modules 102a, 102b on the central office side of the digital loop carrier. As shown therein, four POTS metallic test extension office unit modules 102a are coupled to a 4×48 switch matrix 106 which governs connection to the central office terminal and remote terminals via DS0 communications paths. Likewise, four special service metallic test extension modules 102b are coupled to a 4×48 switch matrix 107 which couple the metallic test extension modules to the DS0 communications path. The POTS metallic test extension modules 102a are also coupled to a 48×4 switch matrix 108 which allocates connections between the 48 central office terminal bypass pairs and the metallic test extension modules 102a. Each of the central office bypass pairs has a direct association with a bypass pair at a particular remote terminal. In the system, any one of the four POTS metallic test extension modules 102a can be coupled to the bypass pair at the central office end to enable testing via the associated bypass pair at the remote end. The metallic test extension units 102b are coupled directly to the special services test units.

Figure 6:
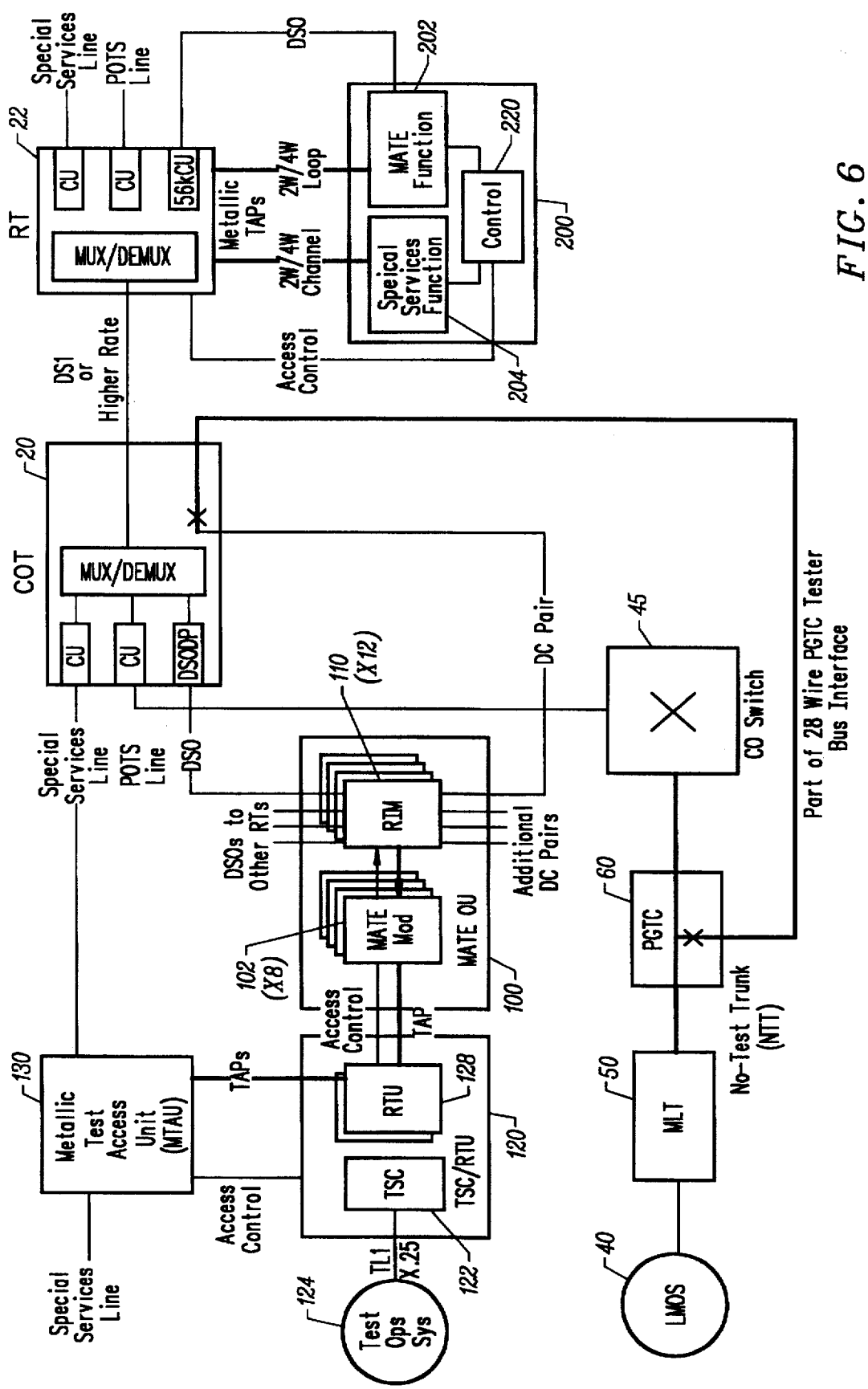
FIG. 6 is a block level diagram illustrating the components at the local end and the remote terminal side of the digital loop carrier which comprise one embodiment of the system of the invention.

FIG. 6 shows the main architectural elements of the system architecture of the present invention. As shown therein, a central office terminal 20 is connected to a metallic test extension office unit 100. Each metallic test extension office unit includes a number of metallic test extension modules 102 and rim modules 110. Each metallic test extension office unit is connected to a Test System Controller/Remote Test Unit (TSC/RTU) 120. A TSC 122 interacts with a test operation system 124, and one or more RTU units 128. The RTU units are coupled to the Metallic Test Access Unit (MTAU) unit 130 which governs access to the special services circuits. As should be generally understood by one of average skill in the art, the MTAU unit 130, while shown separately in FIG. 6, can be integrated with the central office terminal of the DLC system. As shown therein, each RIM unit 110 is coupled to a DS0 connection to the channel unit (CU) of the central office terminal (COT). Up to four COT's may be connected to each RIM module. The RIM unit also includes a DC bypass pair connection with associated inhibit lead which is coupled to the COT switching matrix. The PGTC interface is also coupled to the central office terminal. The RIM grounds the inhibit lead during special services testing to indicate that the remote terminal has been selected and thereby inhibit the POTS testing system from using the test extension function of the metallic test extension unit at the same time.

Each central office terminal COT itself includes a DSODP interface, and a number of channel units (CU) which may be coupled to, for example a special services line or a POTS line. The channel unit connections are multiplexed by a multiplexer/demultiplexer for provision to a digital transmission path which has, for example, a DS1 or higher rate. Each remote terminal (RT) includes a multiplexer/demultiplexer which extracts the signal and feeds it to the appropriate channel unit at the remote terminal. A test bus connection is provided at the remote terminal which will comprise a two, four or six wire connection toward the subscriber and a two, four or six wire connection toward the central office.

At the remote end of the DLC, a metallic test extension remote unit 200 includes metallic test extension remote module 202 and a special services test support circuits 220. As shown in FIG. 6, the remote terminal 22 may include a special services circuit line and a POTS line. The metallic test extension remote unit uses single DS0 interface to receive information from the office unit, and is coupled to the metallic test bus of the RDT to allow POTS testing. The metallic test extension remote unit has an access control port which is coupled to the remote terminal 22.

The remote unit 200 of the system of the present invention includes a controller 220 which is coupled to the special services function and test extension function circuits of the system.

Figure 7A:
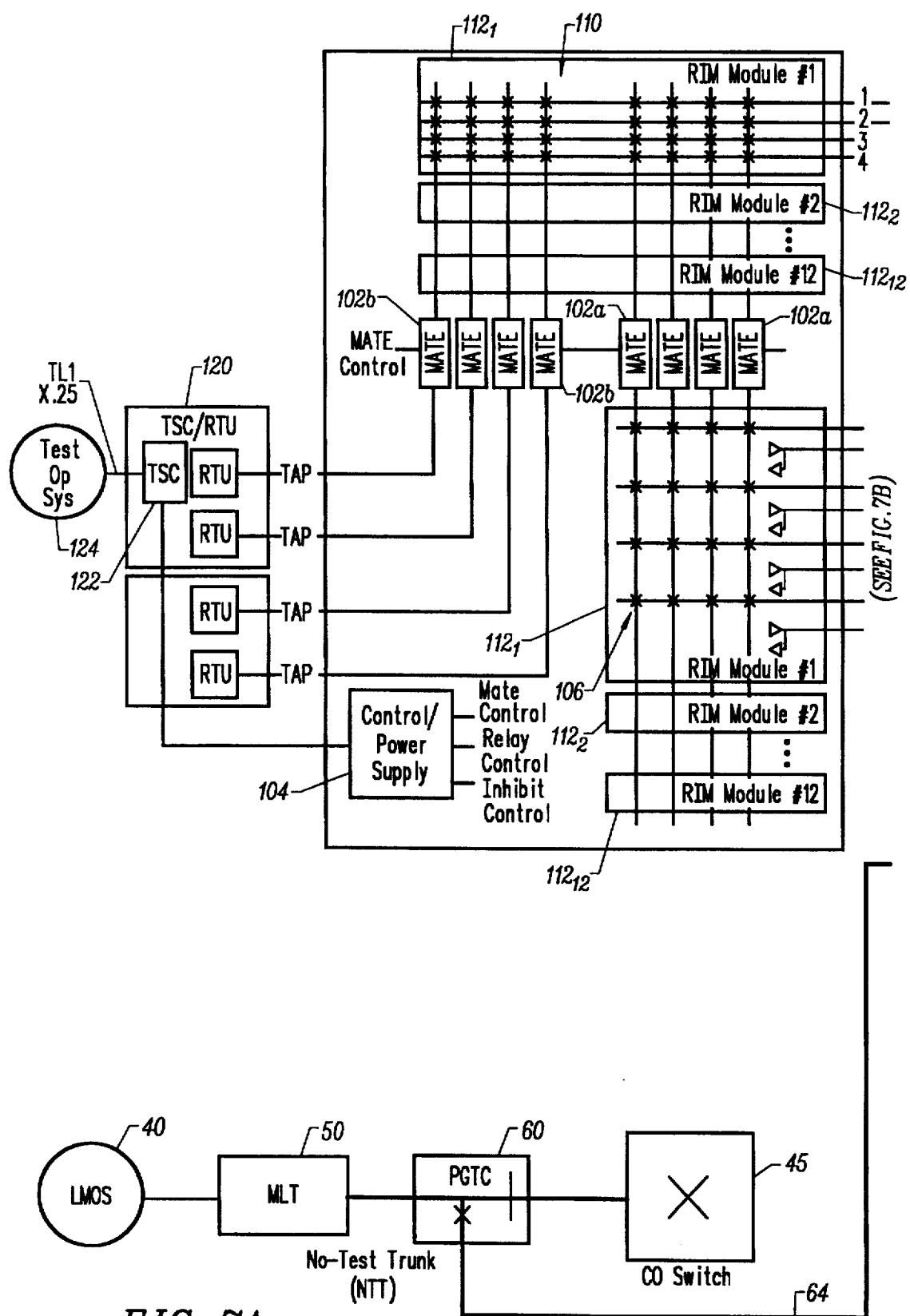
FIG. 7 is a block diagram illustrating the concentration function switching matrices allowing for use of multiple office unit metallic test extension modules with multiple remote metallic test extension units in the system of the present invention.
Figure 7B:
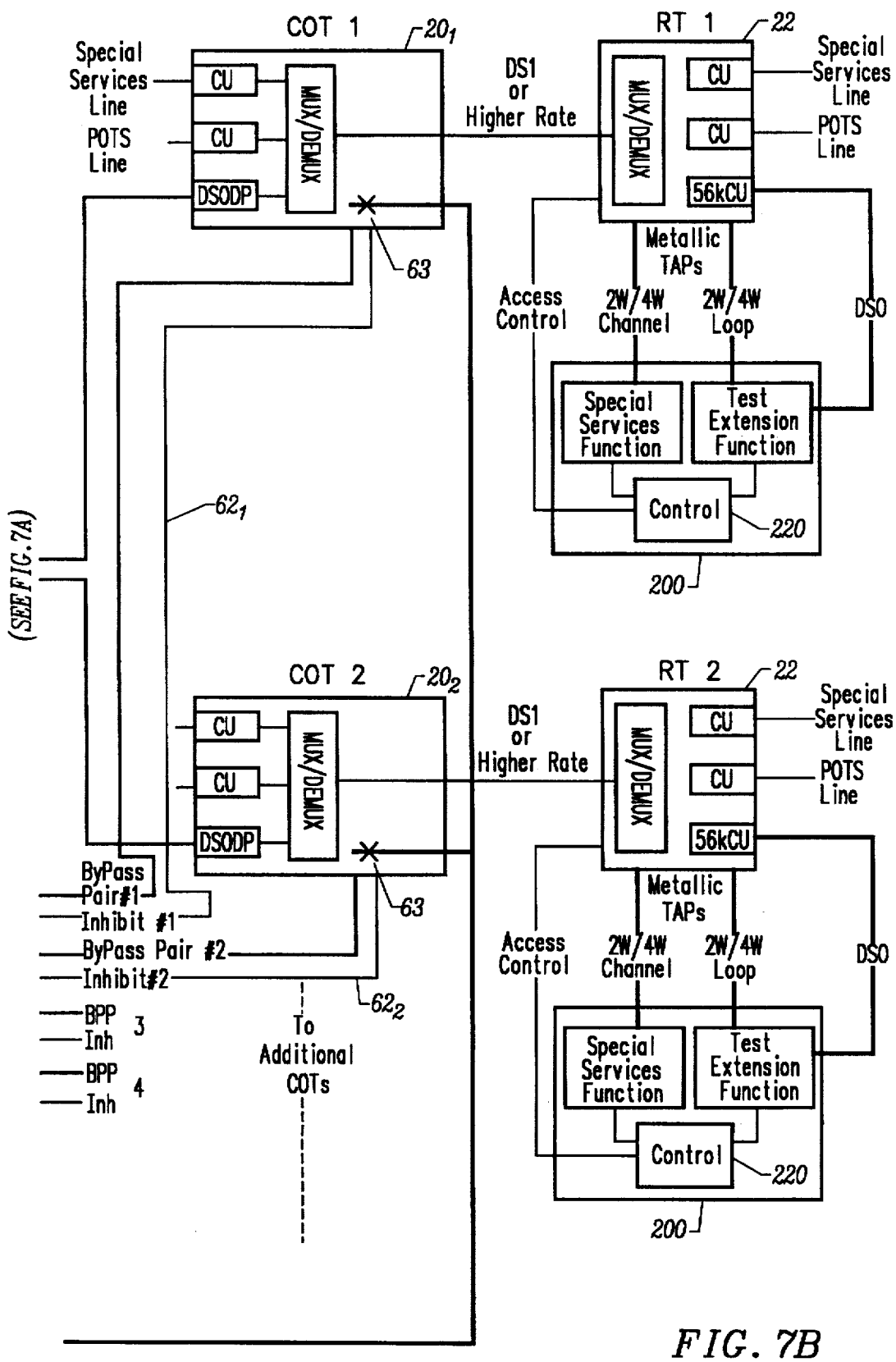

FIG. 7 is a block level diagram similar to FIG. 6, but illustrating the switching configuration of the RIM modules in metallic test extension office unit 100 which enable the office unit to couple to multiple central office terminals and multiple remote terminals.

Each RIM unit 110 comprises a switch matrix 112 which, under the command of control module 104, can interconnect each of the metallic test extension modules 102 to one of four selected bit transport interfaces on the digital loop carrier channel unit at the central office, the channel unit providing a transmission path for a designated remote unit 200. Hence, under command of the controller 104, each of the metallic test extension modules 102 at the central office can establish connection with any of the 48 remote units. The switching matrix 112 in each RIM unit 110 is non-blocking.

As shown in FIG. 7, for POTS lines, testing is normally performed by the MLT 50. MLT 50 is connected via a PGTC and COT to a DC bypass pair and through a RIM module 110 to a metallic test extension unit module 102a in metallic test extension office unit 100. (It should be noted that the RIM modules 110 are shown in a split configuration to illustrate the switching matrix, but both matrices may be physically located in a single RIM module.) Access to a given bypass pair (such as bypass pair #1) is gained through a combination of the PGTC 60 and the central office terminal 20. Each DC bypass pair is conventionally connected through a metallic wire pair extending from COT to RT. However, in the system of the present invention, this DC bypass pair is terminated on the office unit 100 at the central office (as illustrated at termination point 63) and is extended to remote terminal 22 through the metallic test extension office unit 100 and metallic test extension remote unit 200.

Significantly, there is still a one-to-one correspondence between each bypass pair termination and a corresponding remote terminal 22. In addition, each bypass pair has associated therewith an inhibit lead $62_1$, $62_2$ which is grounded by the central office terminal when testing is initiated by the MLT 50. By monitoring inhibit leads, the system of the present invention determines which remote terminal 22 is to be tested when the corresponding inhibit lead at the central office end of the digital loop carrier is grounded.

In general, in response to a request for a test, the system of the present invention will use the RIM switch matrix 112 to connect one of the available metallic test extension modules 102 to the DS0 interface, which is extended to the target remote terminal 22 by the DLC system. In addition, it will connect the particular bypass pair to a metallic port of the office unit metallic test extension module 102a and testing can proceed by the MLT 50. The inhibit lead for the corresponding bypass pair is grounded by the DLC system which blocks access to the remote terminal for special services testing.

For a special services request, the test operating system 124 communicates via an X.25 communication link with the test system controller 122. Contained in the communication from the Test Operating System 124 is the address of the particular remote terminal (RT1, RT2, . . . RTN) for which the specials test is desired. If a remote terminal RT is not under test by the MLT 50, the office unit 100 will use the RIM switch matrix 112 to connect one of the available metallic test extension modules 102b to the DS0 interface of the COT, which is connected to the target remote terminal 22. At the same time, the corresponding inhibit lead for the remote terminal (for example, inhibit 121 for bypass pair #1) will be grounded by the RIM unit so that any test request from MLT 50 for the particular remote terminal (RT) will be blocked by the central office terminal while special services testing is in progress. If the target remote terminal 22 is busy with an MLT test on RT1 at the time a special services request is made for the RT1 remote terminal, office unit 100 will deny access for special services testing as the inhibit lead $62_1$ will have been grounded by the DLC system. A deny command will be sent to TSC 122. It should be noted that the metallic test extension units 102b which are utilized for testing of special services have metallic ports which, in one embodiment of the architecture, are permanently attached to the special services test system 120.

For special services, in addition to extending the test bus to the remote terminals, the system of the present invention also provides a control path to the remote terminal over the DS0 data path. This control path can be used for sending control commands (such as TL1 commands) transparently to the remote terminals 22, to control the test configuration of the metallic test extension remote unit 200, or to exchange system alarms or diagnostic information.

Metallic Test Extension Unit Implementation

FIGS. 8A and 8B show block level, equivalent circuit diagrams of the metallic test extension central office module 102 (FIG. 8A) and remote terminal end, metallic test extension remote unit module 202 (FIG. 8B) which are used to perform the metallic pair extension function.

Metallic test extension office unit module 102 essentially comprises a voltage controlled current source 140 with a shunt admittance Y1. Y1 is a complex admittance, and the value of $I_0$ is determined by a linear combination of the voltage and current at the remote metallic test extension unit 200, given by:

$$I_0 = CV_B + DI_B$$  Equation 1 where C and D are frequency-dependent constants.

Remote unit module 202 comprises a voltage-controlled voltage source 150 with a series impedance Z2. Z2 is a complex impedance and the value of $V_O$ is determined by a linear combination of the voltage and current at the metallic test extension office unit terminals as defined by:

$$V_O = AV_A + BI_A \qquad \text{Equation 2}$$

where A and B are frequency-dependent constants.

Note that, in contrast to the Tollgrade system, the equivalent circuits of the office unit end and remote unit end are not identical. Impedance Z2 represents a small resistance at DC and low frequencies; admittance Y1 represents a high impedance at DC and low frequencies.

For purposes of the description, the term "high impedance" can be defined as the minimum impedance which must be detected by a test system in order for the test system to consider a test pair to have an acceptable connection as a true metallic cable. For example, the prior art test systems for POTS and special services discussed herein must detect a minimum impedance of 3 MΩ. In a key distinction from prior art metallic emulation technologies, the admittance Y1 is defined by design, rather than by equivalence. It should be understood that the admittance in the present system can then be designed to accommodate any test system impedance requirement. In the present system, Y1 is a complex admittance whose value changes with the frequency of the signals. For example, the impedance at DC is essentially infinite—up to 15-50 MΩ. The exact construction of the admittance circuit Y1 and impedance circuit Z is described below with respect to FIG. 14. For purposes of the description, low frequencies can be defined as being those frequencies at which a test system, such as the test systems used herein, use in testing the POTS and special services circuits. Without limiting those frequency ranges, such frequencies are in a range of DC-200 Hz.

In operation, if a voltage is impressed on the office unit terminal 114, a proportional voltage $V_O$ is impressed at terminal 214 in remote unit 200. This, in turn, results in current flow $I_B$. This current flow causes the drawing of a proportional current $I_O$ from the terminal 114 which impressed the original load on the office unit. Thus, the system behaves as if the load was connected to the terminal 114 directly.

In a unique aspect of the metallic test extension architecture, the values of parameters A, B, C, D, Y1 and Z2, are selected to obtain an acceptable performance level for the metallic test extension units of the present invention, and maintain circuit stability under various load and source configurations, and under various transmission delays in the digital loop carrier system.

In its simplest form, Y1 is a capacitor in series with a resistance. Impedance Z2 is equivalent to a resistance in series with an inductance, the inductance being in parallel with a resistance. At a first order of approximation, A and D are at unity.

The choice of the parameters for A, B, C, D and Y1 and Z2 is very much dependent on the amount of delay expected in the system. Delay in the system results from the analog-to-digital and digital-to-analog conversions, and transmission delays in the DLC. In order to compensate for these delays, the system utilizes a feature of automatically building out the delay to a fixed delay value in order to allow for the design of the circuit to be centered around a common expected delay level. This gives the system of the present invention a constant equivalent cable length between the office unit and the remote unit. In the Tollgrade MCU, the equivalent length of the cable equivalent circuit will vary with the length of the delay of the system.

FIG. 9 is an approximation of the equivalent circuit of the metallic test extension office unit to remote unit at low frequencies and DC loads. It should be noted that the circuit shown in FIG. 9 is the same as the equivalent circuit for a piece of cable. Parameters B and Z2 determine the value of the series resistance while parameters C and Y1 determine the value of the shunt capacitance.

As will be recognized by one of average skill in the art, the MLT and special services test systems require operation in the DC and low frequency range. Telephone voice communication traffic signals have frequencies extending to approximately 3000 Hz. The circuit of the present invention is designed for optimal extension of the DC and low frequency signals used in the test functions, as well as acceptable transmission of voice signals in the audio range.

Figure 10:
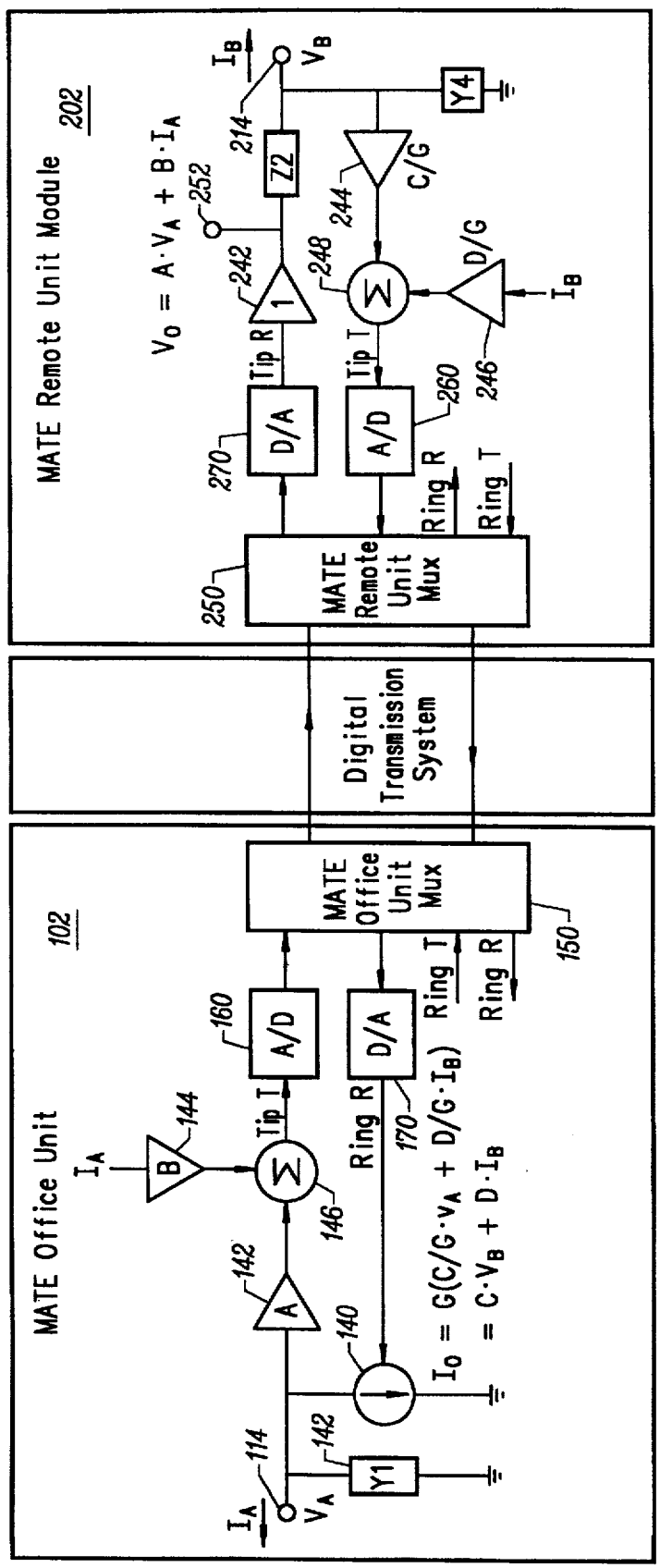
FIG. 10 is a block level diagram of the metallic test extension circuitry used to implement the test system of the present invention.

FIG. 10 shows a more detailed, block level diagram of the metallic test extension office unit module 102, metallic test extension remote unit module 202, and their interaction with the digital transmission system.

The circuit elements of metallic test extension office unit module 102 are shown as functional blocks. Terminal 114 represents the tip signal input terminal for a given metallic bypass pair at the office unit end, after delivery to module 102 from a RIM module. A corresponding Ring terminal and functionally equivalent Ring circuit to that shown for the Tip terminal 114 is not shown. Shunt admittance Y1 is coupled to terminal 114. In FIG. 10, the voltage input at terminal 114 passes through a gain stage 142 shown as contributing a gain having a value of A (where A is unitless). The current $I_A$ at terminal 114 is also input to a second gain stage 144 which has units of impedance associated with it. The outputs of gain stages 142,144 are coupled at summing node 146. The signal is then coupled to analog-to-digital converter circuitry 160. The output of analog-to-digital converter circuitry 160 is transmitted to a metallic test extension office unit multiplexing circuitry 150, which multiplexes and frames the signals into the digital transmission stream. The output of the MUX/Framer 150 is provided to the RIM module 110 (not shown in FIG. 10), for transmission across the digital transmission system. As detailed herein, the component signals transmitted through the digital transmission system are processed into metallic and longitudinal signals prior to digital conversion and transmission through the digital transmission system.

Remote unit 200 has a corresponding remote unit multiplexer 250 which receives the framed and multiplexed signals and removes the framing and demultiplexes the Tip and Ring component signals. The received Tip signal is provided to a digital-to-analog converter 270 which outputs an analog signal to a first unity gain stage circuit 242. Terminal 252 represents the output of the voltage controlled voltage source 240 at which $V_O=AV_A+BI_A$ which is fed back into the circuit at terminal 252. The signal then passes through impedance Z2 and current $I_B$ is seen on terminal 214. This current is returned to the office unit metallic test extension module via gain stages 244 and 246, which are summed at node 248 as the load is passed through analog-to-digital converter 260 and returned to the metallic test extension remote unit multiplexing/framing circuit 250. When received by the office unit, the return signal is passed through digital-to-analog converter 270 and input to current source 140.

Metallic Test Extension Office Unit

Figure 11A:
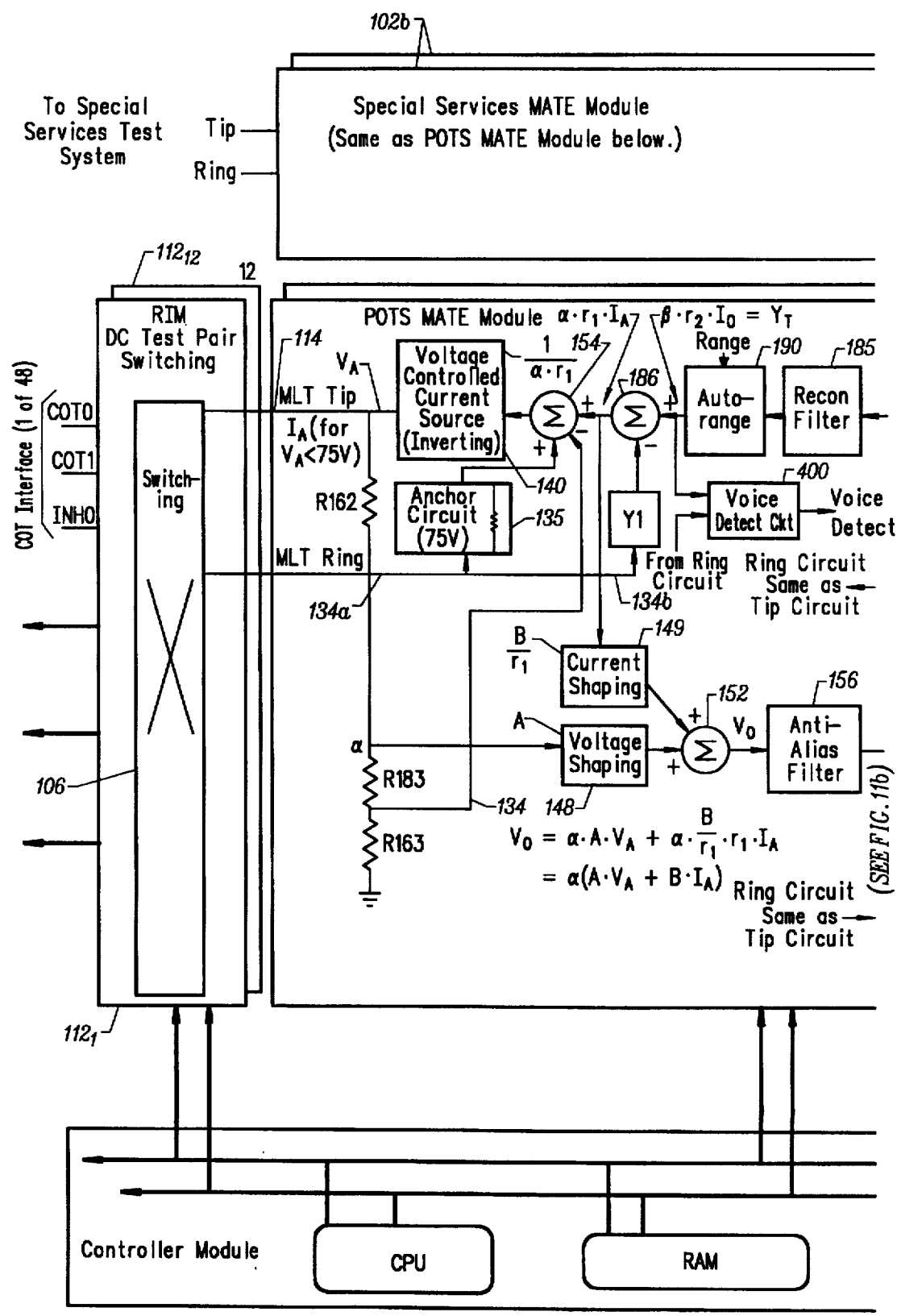
FIG. 11 is a more detailed block level diagram of an individual office unit module as coupled with other functional elements of the system of the present invention and the circuitry comprising the office unit module which is used to implement the metallic Test Extension function.
Figure 11B:
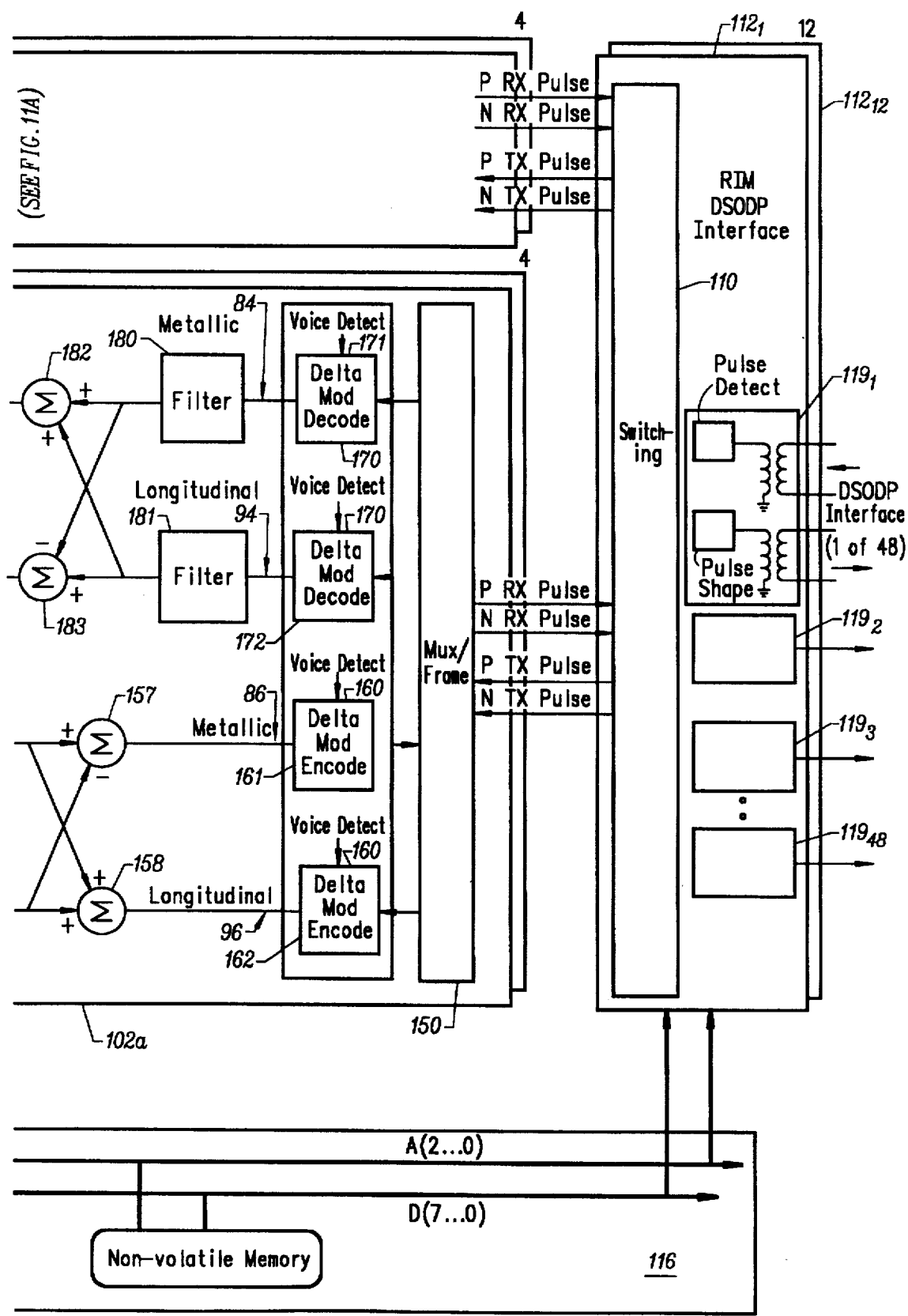

The metallic test extension office unit 100 is shown in FIG. 11 in block level form. As shown therein, office unit 100 may comprise several modular components which can be selectively added or removed to complete configuration of office unit 100. As shown in FIG. 11, office unit 100 includes, for example, four special services metallic test extension modules 102b, four POTS test metallic test extension modules 102a, and a controller module 116. Also shown are the RIM modules 112 which, as with respect to FIG. 7, are physically contained in a simple module unit but contain a RIM DSODP interface module 110, and the RIM DC test pair switching module 106.

As shown generally in FIG. 11, the RIM DC test pair switching modules 106 act as an interface to the central office terminal metallic pair connections. Once a particular central office terminal MLT unit is coupled via the switching module 106, an MLT tip signal is received by metallic test extension modules 102b. As shown in FIG. 11, metallic test extension modules 102a and 102b are essentially identical; the only differences exist in how they are coupled externally to the DC test pair switching module 106 or specials services test system.

Included in FIG. 11 is a more detailed functional block diagram of the circuit elements comprising office unit metallic test extension module 102 than that shown in FIG. 10. For clarity, only the Tip circuit portion will be hereinafter described. It should be understood that the Ring signal line (MLT RING) is identical to the MLT Tip circuit, and the special services metallic test extension module is identical to the POTS metallic test extension module.

As shown in FIG. 11, a voltage $V_A$ impressed by the tip line, 114 (MLT TIP) passes through divider resistors R162, R183, and R163. The divided down input voltage is supplied via voltage shaping circuit 148 to a summing node 152. It should be noted that the voltage shaping circuit 148 contributes gain component A to the input voltage $V_A$. Summing node 152 also receives current feedback from the remote unit via a current shaping circuit 149, which contributes the B gain value to the voltage component at node 152. Resistors R183 and R163 reduce the input voltage $V_A$ in order to scale the voltage to a level suitable to the voltage range of the circuits. Conductive line 134 provides feedback path to an anchor circuit 135, which is coupled between resistors R162 and R183 and is utilized when the MLT or other test system has no ground path. In such cases, the input Tip signal will tend to drift to the supply voltage rail if any current is present. The anchor circuit presents a very high impedance if $V_A$ is reduced below 75V. The anchor circuit provides a DC leakage path at $V_A$ voltages nearing 75V which is gradually reduced to limit the voltage to approximately 75 volts. The output of summing node 152 is $V_O$, defined by Equation 2. The value $\alpha$ is a scaling factor contributed by resistors R162 and R183 provided to an anti-alias filter 156. Anti-alias filter 156 is essentially a low pass filter, attenuating all frequencies in the signal above 12 kHz.

Summing nodes 157 and 158 implement one of the unique features of the metallic test extension module. Prior to transmission and conversion to a digital signal, the analog tip and ring signals are summed and subtracted, respectively, to produce a metallic and longitudinal signal in accordance with the following equations:

$$V_{LONGITUDINAL} = \frac{V_{TIP} + V_{RING}}{2} \quad \text{Equation 3}$$

and $$V_{METALLIC} = \frac{V_{TIP} - V_{RING}}{2} \quad \text{Equation 4}$$

The longitudinal and metallic signals are common mode and differential signals, respectively, thereby giving improved performance for voice transmission signals and longitudinal measurements which are made by MLT.

The metallic and longitudinal signals are provided to the analog-to-digital converter circuitry 160 which, in one embodiment of the invention, comprise delta modulation encoders 161 and 162. A delta modulation encoder is a specific type of analog-to-digital converter. A delta modulation analog-to-digital converter and digital-to-analog converters 170, such as that shown in co-pending patent application Ser. No. 08/652,857, Inventors Brad T. Darnell, Rouben Toumani and Paul Bauer, filed concurrently herewith and assigned to the assignee of the present application, is suitable for use in the metallic test extension module of the present invention. The delta modulation converter provides several advantages as an analog-to-digital and digital-to-analog converter which make it attractive for use in the metallic test extension office unit. The delta modulation converters result in improved dynamic range at low frequencies which is critical to high performance of the testing systems while maintaining acceptable performance at voice frequencies. The delta modulator converters contribute little to transmission delay, which improves the accuracy and stability of the test system. Moreover, the delta modulation scheme requires relatively little transmission bandwidth, allowing the system of the present invention to require only one DS0 channel of the digital loop carrier. The output of each delta modulation analog-to-digital encoder is a 24 Kbps signal providing data to the remote unit which corresponds to the value of the metallic (24 kbps) and longitudinal (24 kbps) signals at the office unit. The output of the digital-to-analog conversion circuitry is provided to the DSODP interface 119.

Incoming (digitally encoded) longitudinal and metallic signals from the remote unit are coupled via the RIM module (DSODP interface) 112 to the MUX/framer 150 to de-multiplex the metallic and longitudinal signals. The encoded metallic and longitudinal signals are provided to the digital-to-analog converter circuitry 170 comprising first and second delta modulation decoders 171 and 172.

The analog metallic and longitudinal signals are provided to filters 180, 181, respectively, which improve the longitudinal balance presented to the MLT at the 200 Hz measurement frequency.

The output of filters 180,181 is provided to summing nodes 182 and 183 which convert the metallic and longitudinal signals into tip and ring signals by reversing the summing and subtracting functions described in equations 4 and 3, respectively.

The Tip signal is coupled from summing node 182 to a reconstruction filter 185. Reconstruction filter 185, which removes the high-frequency components generated in the decoding process, is a second order active Butterworth low pass filter with a −3 dB frequency of approximately 3 kHz.

An autoranging circuit 190 acts in concert with a corresponding autoranging circuit 290 in the remote terminal metallic test extension module 202 to improve the signal-to-noise ratio of the transmitted signal before and after digital-to-analog and analog-to-digital conversion by the conversion circuitry 160,170. The autorange circuit at the remote end increases the gain of the returning tip and ring signals, while autorange circuit 190, conversely, decreases the gain of the received tip and ring signals.

The output of autorange circuit 190 is provided to a voice detect circuit 400 which will be explained below with reference to FIG. 16. In general, voice detect circuit 400 is coupled to both the Tip circuit and Ring circuit and senses an increase in the DC component of the metallic load current for a sustained period of time, and when these conditions are met, a signal is directed to the delta modulation encoders 161,162 and decoders 171,172 to allow them to change their conversion parameters to more accurately reflect the higher frequency transmission. Operation of an exemplary delta modular in this mode is described in the above-cited co-pending application Ser. No. 08/652,853. The output of autorange circuit 190 is a voltage $V_T$ which is equal to $\beta r_1 I_0$ wherein $r_1$ is a resistance scaling factor of the office unit based on the resistances used therein, and $\beta$ is a scaling factor contributed by resistors in remote unit module. At summing node 186, the output of admittance Y1 is coupled with the output of the auto range circuit. The result is a signal equalling $\alpha r_1 I_A$, which is provided to summing node 154 and current shaping circuit 149.

Summing node 154 couples the scaled signal from line 134, the output of anchor circuit 135 and the output of summing node 186, and provides this signal as an input to voltage controlled current source 140. Feedback path 134 is used to achieve high input impedance at the Tip terminal.

Controller module 116 includes a microprocessor (CPU) configurable system memory (such as RAM), and nonvolatile memory, such as programmable firmware to allow it to interpret commands and control access to the remote terminals, primarily for the special services testing system. An address and data bus connect the controller module to the components of the office unit. The controller interprets commands from the special services test operation system and translates those commands into control words which are supplied to the framer/multiplexer 150 for inclusion in the control path to the remote unit. Controller 220 at the remote unit interprets the control word and implements configuration of the special services test functions in accordance with the particular control command received. Controller 220 also supplies responding control words to the controller block 116. For example, in the system of the present invention, the special services test operations system will provide a test request for a particular remote terminal and will supply the terminal address of the terminal. Controller 116 is responsible for interpreting the address and providing the appropriate control words to configure the test functions at the correct remote terminal, and for grounding the inhibit lead of the bypass pair associated with the particular remote terminal for which the special services test has been requested. The controller also implements proper switching in the switch matrices in the RIM modules 112.

Metallic Test Extension Remote Unit

Figure 12:
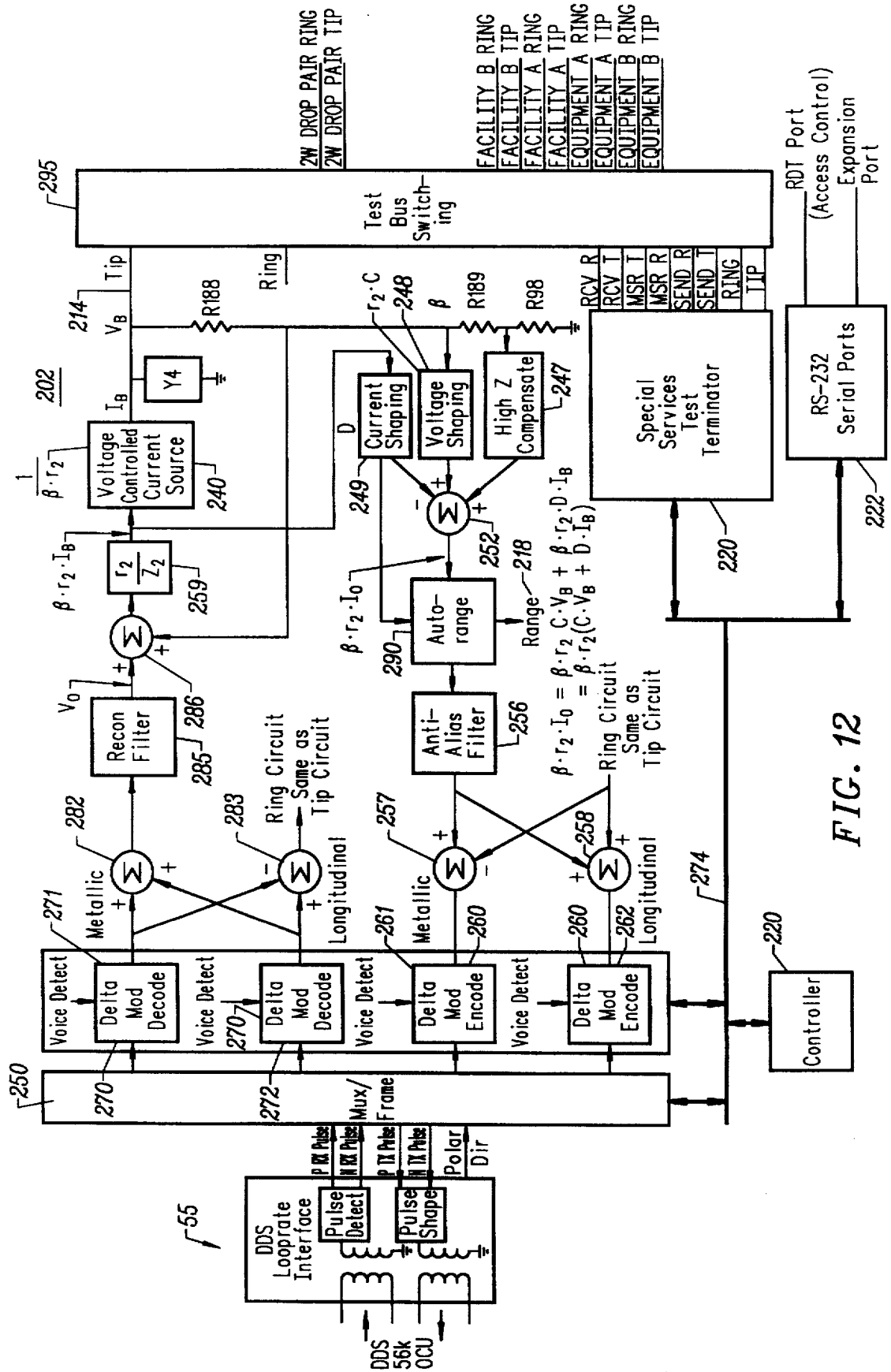
FIG. 12 is a block level diagram of a remote unit terminal showing the circuitry used for metallic carrier emulation and the interaction of such circuitry with other functional elements of the remote terminal.

FIG. 12 is a block level diagram of the metallic test extension remote module 202. The remote module 202 is coupled to the digital loop carrier via a loop rate interface 55 (for example a DS0 or DS1 interface) which is standard to many digital loop carrier systems. One advantage of the system of the present invention is its ability to use the standard DS0 interface of multiple types of DLC systems. On some type of DLC systems, the RT interface is 56 kbps.

A multiplexer and framing circuit 250 is generally equivalent to the multiplexer and framing circuit in the office unit and will be explained with reference to FIG. 20. The MUX/framer 250 extracts or combines (depending on direction) the digitally encoded metallic and longitudinal signals.

Again, analog-to-digital conversion circuitry 260 and digital-to-analog conversion circuitry comprise delta modulation encoders 261,262 and delta modulation decoders 271,272, are respectively provided for the incoming and outgoing metallic and longitudinal signals. Incoming metallic and longitudinal signals from the office unit are provided to summing nodes 282 and 283, which sum and subtract the longitudinal and metallic signals to extract the Tip and Ring signals in a manner which is the inverse of Equation 3 and Equation 4.

The reconstruction filter 285 is provided to remove the high frequency components of the signal at 292 resulting from analog-to-digital and digital-to-analog processes. Summing node 286 combines $V_0$ output with a scaled portion of $V_B$ tapped from the Tip signal line 214 on the remote test bus. The output of summing node 286 is passed through a frequency shaping amplifier circuit 259 to yield an output signal equal to $\beta r_2 I_B$ where $r_2$ is a scaling factor based on the sum of resistances in the remote metallic test extension module 202 and $\beta$ is a scaling factor provided by resistors R188 and R189. This signal is input to a voltage controlled current source, with a transconductance $1/(\beta r_2)$, yielding output current $I_B$.

The output current $I_B$ of the voltage-controlled current source is shunted with admittance Y4 yielding $V_B$ at the tip terminal. The output of frequency shaping amplifier 259 ($\beta r_2 I_B$) is provided to a current shaping circuit 249 which provides the "D" component factor shown in FIG. 10. Resistors R198 and R98 provide a scaling factor $\beta$ and inputs to filter shaping circuit 248 and high impedance compensation circuit 247. The outputs of current shaping circuit 249, voltage shaping circuit 248 and high impedance compensation circuit 247 are combined at summing node 252 and the combined signal provided to an auto ranging circuit 290. Autoranging circuit 290, like autoranging circuit 190, increases the gain of the signal for transmission across the DLC datapath to anti-alias filter 256 and summing nodes 257 and 258 for combination into metallic and longitudinal signals for transmission to the office unit. Current shaping circuit 249 also provides a signal to autorange circuit 290, which is used to decide whether circuit is in high or low gain mode. A controller module 220 is provided and includes a microprocessor RAM and non-volatile memory coupled by an address and data bus to the multiplexer and framer 250, delta modulation encoders and decoders 260, 270, and the special services test functions and RS232 serial ports 222.

Metallic Test Extension Modules—Office Unit

FIGS. 13–16 are schematic diagrams showing one embodiment of the implementation of the circuits in POTS metallic test extension module 102a. As the special services metallic test extension modules 102b are equivalent in design to the POTS metallic test extension modules 102a, only the POTS modules 102a will be hereinafter described.

Figure 13A:
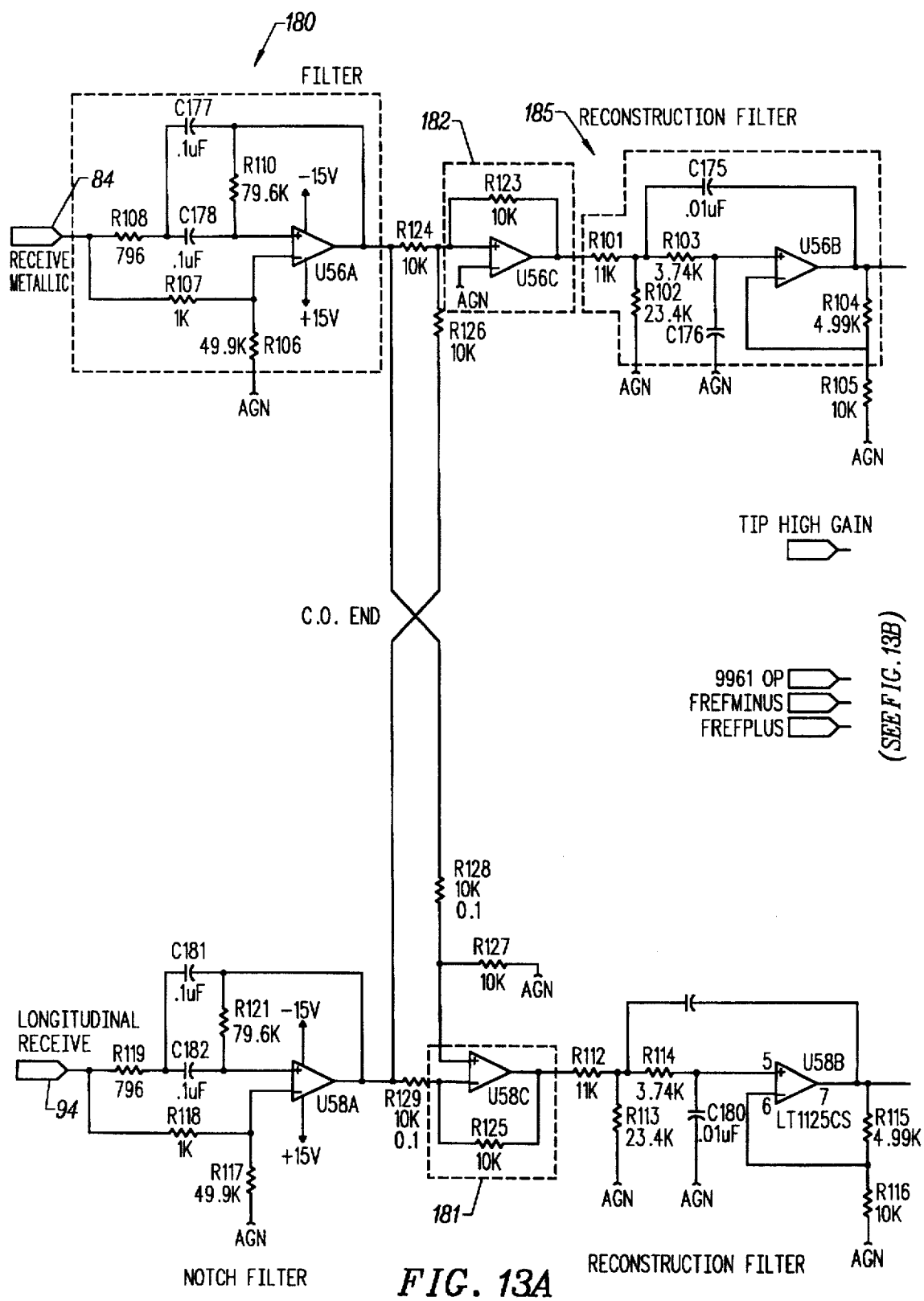
FIG. 13 is a schematic representation of the metallic test extension module shown in FIG. 12.
Figure 13B:
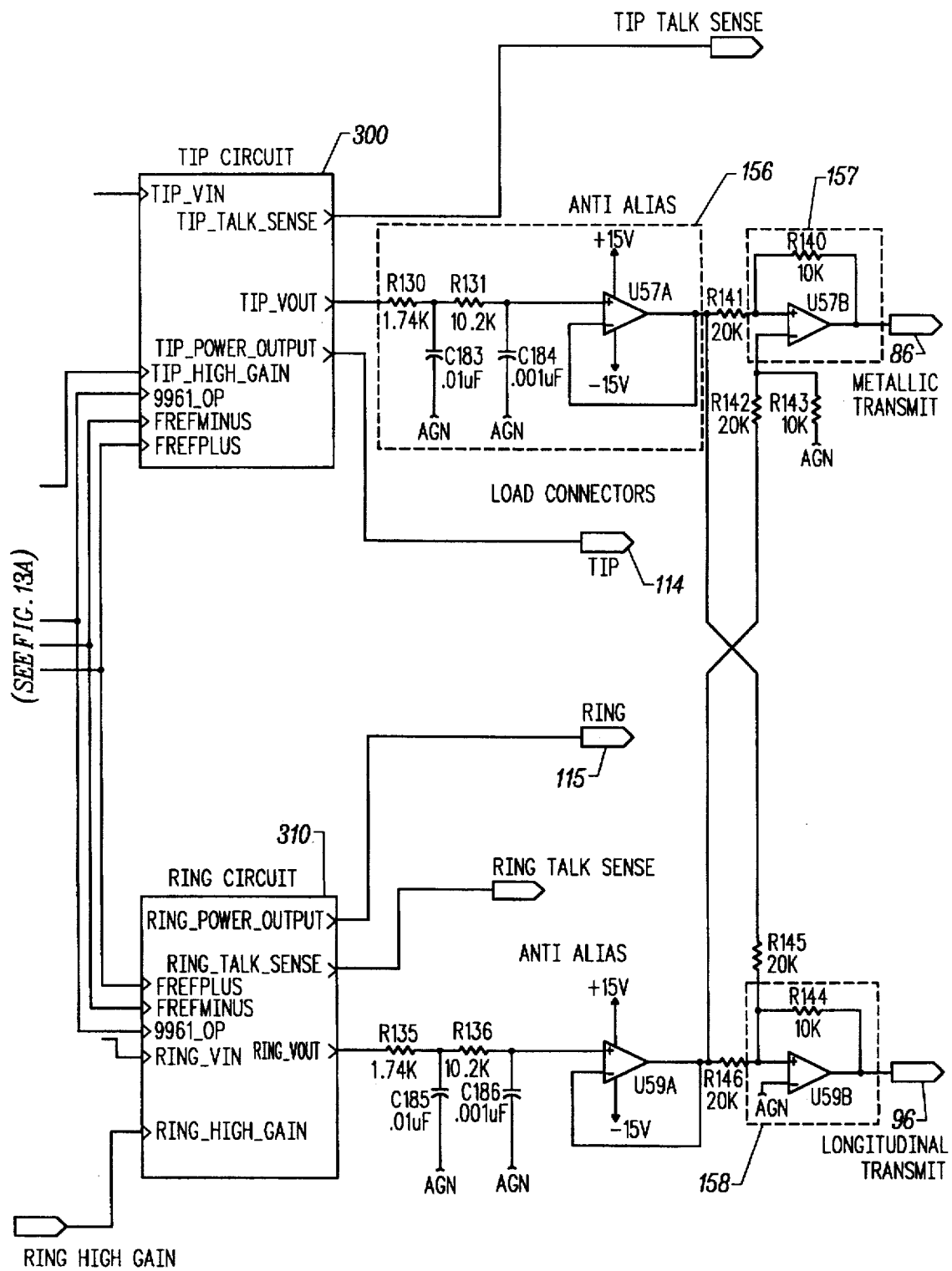

FIG. 13 is a schematic diagram of the office unit metallic test extension module showing, in further detail, the block elements set forth in FIG. 11 with the equivalent portions of both Tip and Ring circuits of POTS metallic test extension module 102a. Because the Tip and Ring circuits and serial filters are equivalent, only Tip circuit components are hereafter described in detail, while Ring circuit components are described to the extent necessary to illustrate areas of interaction between the circuits.

FIG. 13 also shows schematic representations of filter 180, summing nodes 181 and 182, reconstruction filter 185, summing nodes 157 and 158, and anti-alias filters 156.

Figure 14:
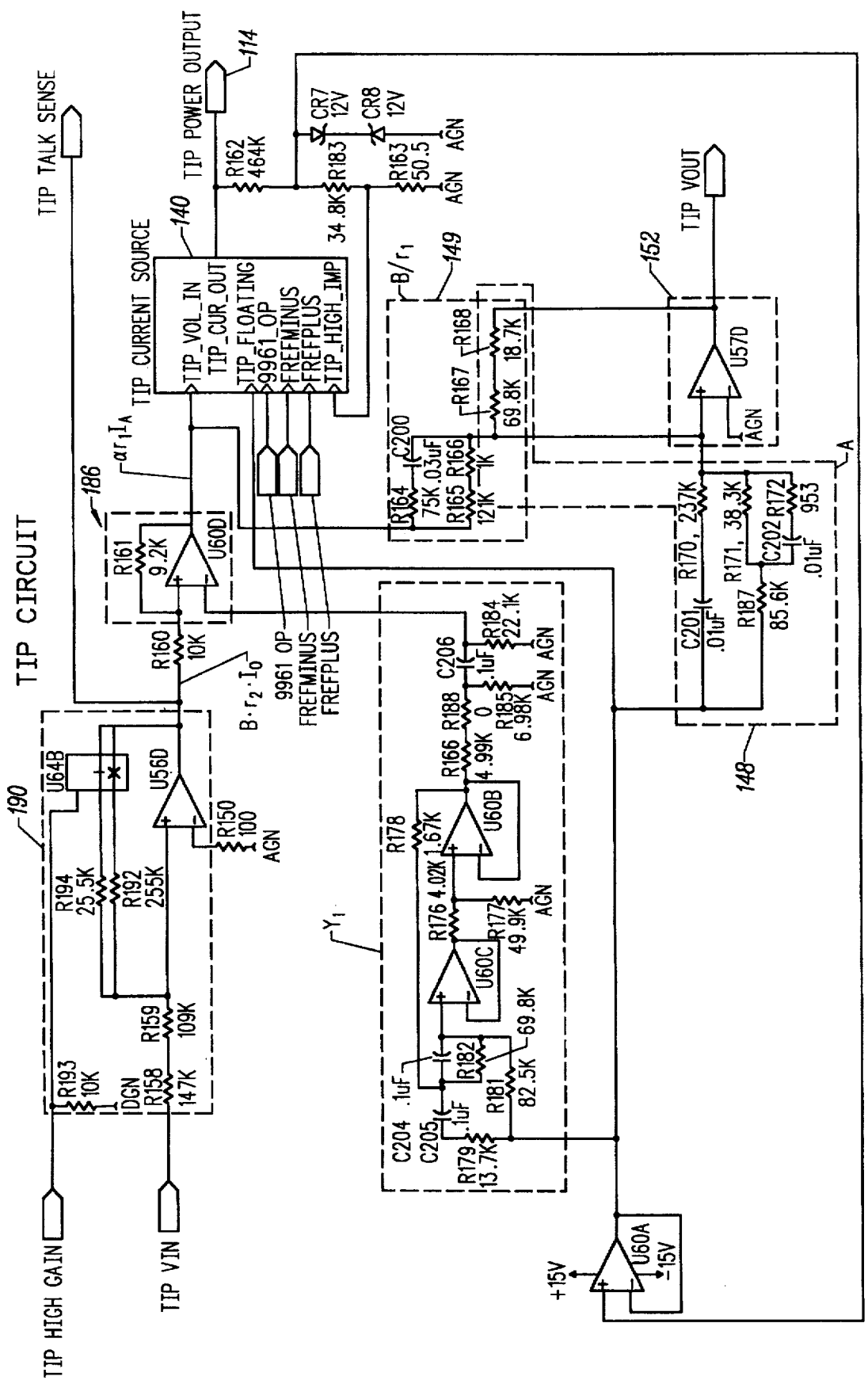
FIG. 14 is a schematic diagram of the central office tip circuit represented in FIG. 13.

Tip and Ring load connectors 114 and 115 comprise terminals to which the DC test pair or special services test system input/output may be provided to the metallic test extension module 102. In the present system, terminals 114,115 are coupled to either a rim switching module 112, if module 102 is a POTS test module, or the special services test system. Terminals 114 and 115 are coupled to the TIP_POWER_OUTPUT of Tip circuit 300 and RING_POWER_OUTPUT of Ring circuit 310, respectively. Details of the office unit Tip circuit 310 are shown in FIG. 14. (The office unit Ring circuit 310 is equivalent to Tip circuit 300 and, for brevity, is thus not detailed herein).

Figure 16:
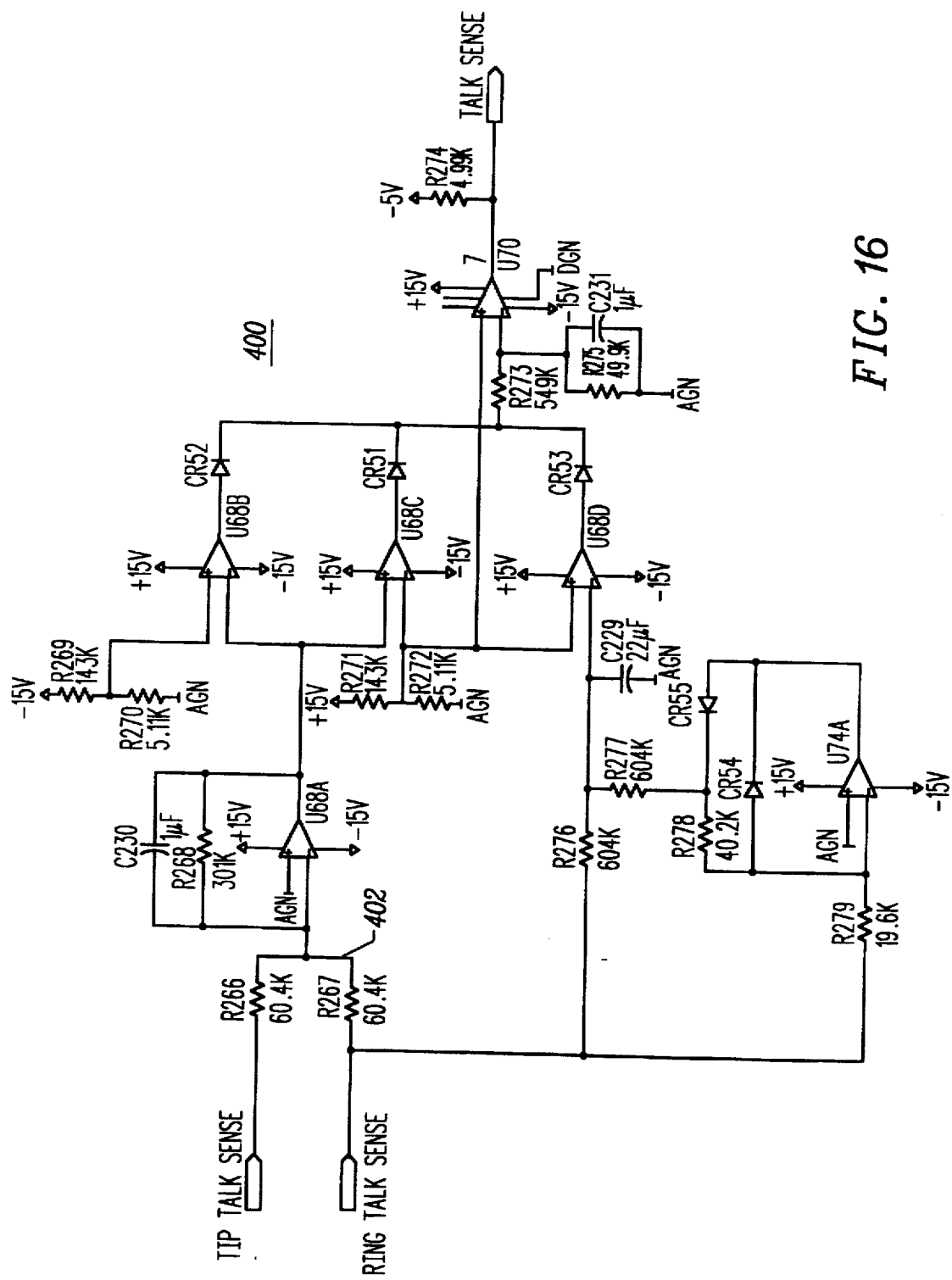
FIG. 16 is a schematic diagram of the talk-sense circuit represented in block form in FIG. 12.

Tip circuit 300 and Ring circuit 310 include TIP_TALK_SENSE and RING_TALK_SENSE outputs which are coupled to the talk sense circuit 400, detailed in FIG. 16.

Tip circuit 300 and Ring circuit 310 also include the TIP_VOUT outputs (equivalent to $V_O$ in FIG. 11) which are provided to anti-alias filter 156 and a corresponding anti-alias filter 155 for the Ring circuit. The anti-alias filter outputs are provided to summing nodes 157 and 158, which perform the processing of Equations 4 and 3, respectively, converting the Tip and Ring signals into metallic end longitudinal signals for transmission through the analog-to-digital conversion circuitry 160, as described with respect to FIG. 11.

Anti-alias filter 156 is exemplary of the anti-alias filters used in both the office unit module 102 and remote unit module 202. Anti-alias filter 156 comprises two low pass RC filter circuits comprising resistor R130 (1.74 KΩ), and C183 (0.01 μF) and R181 (10.2 KΩ) and C184 (0.001 μF) along with operational amplifier U57A coupled as a voltage follower.

Summing nodes 157 and 158 are comprised of amplifier U57B and amplifier U59B coupled as summing amplifiers. Resistors R141 (20 KΩ), R140 (10 KΩ) are coupled to the inverting input of amplifier U57B, and resistor R142 (20 KΩ) coupling the output of filter 155 to the non-inverting input of amplifier U57B. The inverting input of summing amplifier U59B is coupled via resistors R145 (20 KΩ) and R144 (10 KΩ) to the output of anti-alias filter 156, and via resistor R146 (20 KΩ) to the output of anti-alias filter 155. The output of summing nodes 157 and 158 comprises the METALLIC_TRANSMIT and LONGITUDINAL_TRANSMIT signals which are provided to the analog-to-digital conversion circuitry 160.

Also shown in FIG. 13 is the composition of filter 180 and reconstruction filter 185. The corresponding Ring circuit filter 181 and reconstruction filter are likewise shown. A received metallic signal terminal 84 and received longitudinal signal terminal 94 are coupled to the digital-to-analog conversion circuitry 170.

Filter 180 is comprised of resistors R106 (49.9 KΩ), R107 (1 KΩ), R108 (796 KΩ), and R110 (79 6 KΩ), capacitors C177 (0.01 μF) and C178 (0.01 μF), and amplifiers U56A. The returning metallic signal is coupled to tap 84. At filter 180, metallic receive signal is input to the inverting input of amplifier U56A via resistor R108 and capacitor C178. Capacitor C177 splits the input signal across resistor 110 which is also coupled to the output of amplifier U56A. The non-inverting input of amplifier U56A is coupled to ground via resistor R106, which includes a tap to the input metallic signal across resistor R107 Filter 180 attenuates high-frequency components of the signal which may be generated during the analog-to-digital conversion from the remote unit to the digital transmission medium, and digital-to-analog conversion from the digital transmission medium to the office unit module.

The output of the filters 180,181 (amplifiers U56A and U58A) comprises the input for summing nodes 181 and 182.

Amplifiers U56B and U58C are coupled in a multi-input summing amplifier fashion which combines, with respect to amplifier U56C, the current across resistors R124 (10 KΩ) and R126 (10 KΩ) at the inverting input, and ground at the non-inverting input, and with respect to amplifier U58C, the current across resistor R128 (10 KΩ) and at the non-inverting input and resistor R129 (10 KΩ) at the inverting input thereby implementing the inverse of equations four and three to provide the Tip and Ring signals from the remote unit.

The signal is thereafter provided to Tip reconstruction filter 185 (and corresponding Ring reconstruction filter) shown in FIG. 13. The Tip reconstruction filter 185 comprises resistors R101 (11 KΩ), R102 (23.4 KΩ), R103 (3.74 KΩ), R104 (4.99 KΩ), R105 (10 KΩ), capacitors C175 (0.01 μF) and C176 (1.01 μF), and amplifier U56B. The Tip signal output from summing node 182 is coupled to the non-inverting input of comparator U56B via resistors R101 and R103. A shunt resistor R102 is coupled between resistors R101 and R103, as is capacitor C175, which is also coupled to the output of comparator U56B. A low pass filter is provided by resistor R103 and capacitor C176. Resistors R104 and R105 act as a voltage divider for the output signal which is provided to the inverting input of comparator U56B. The output of the reconstruction filters are provided to the Tip circuit 300.

Also shown in FIG. 13 are the FREF minus, FREF plus, and 9961_OP inputs to Tip circuit 300 and Ring circuit 310. These signals comprise reference voltages enabling the 75 volt limit imposed by anchor circuit 135 and this operation is described with respect to FIG. 15.

FIG. 14 shows the office unit module Tip circuit 300 in additional detail. Specifically shown in FIG. 14 are the configurations of autorange circuit 190, summing node 186, current shaping circuit 149, admittance Y1, and summing node 152.

The TIP_V_IN signal, output from reconstruction filter 185, is provided to autoranging circuit 190. The TIP_HIGH_GAIN input signal is provided by the MUX/framer 150 which selects between a high gain mode in the received signal from the remote module. The signal controls switch U64B which selects enablement of a resistor network comprised of R192 (25.5 KΩ) and R194 (255 KΩ) and amplifier U56D, and hence selection between low-impedance and high-impedance modes of operation. In low-impedance mode, the unity gain of the office unit module Tip circuit is one-to-one (with resistor R192 in the feedback path). In high-impedance mode, the autoranging circuit attenuates the input signal by a factor of approximately ten (with resistor R194 in the feedback path).

The autorange circuit output is provided to the talk sense circuit 400 via the TIP_TALK_SENSE signal and is coupled to summing node 186. Summing node 186 is comprised of amplifier U60D, and resistors R160 and R161. The output of autorange circuit 190 is equivalent to the current $I_0$ at the remote end, multiplied by $\beta$, the scaling factor at the remote end, and $r_2$, the resistance at the remote end.

The TIP_POWER_OUTPUT signal is coupled to Tip input terminal 114. Summing node 186 thus sums the load at the office unit Tip input 114 via admittance circuit Y1 with the output of autorange circuit 190. At the output of summing node 186, the signal has the value of the scaling factor $\alpha$ (contributed by resistors R162 (464 KΩ) and R183 (34.8 KΩ)) multiplied by the office unit module resistance factor $R_1$, multiplied by the current $I_A$.

The schematic diagram of the elements making up admittance Y1 is shown in FIG. 14. The input to the admittance circuit Y1 stems from a tap coupled between divider resistors R162 and R163. This signal is provided to the non-inverting input of amplifier U60C coupled as a voltage follower. The first stage of admittance circuit Y1 includes capacitors C205 (0.01 µF) and C204 (0.01 µF) coupled in series with resistor R179 (13.7 KΩ). Resistor R182 (69.8 KΩ) is coupled in parallel with capacitor C204 (0.01 µF) and resistor R181 (82.5 KΩ). A first voltage follower amplifier U60C includes a non-inverting input coupled to capacitor C204, and resistors R181 and R182. A feedback path from the output of amplifier U60B is coupled through resistor R178 (1.87 KΩ) to capacitor C204 and resistor R182. Between the output of amplifier U60C and a second stage voltage follower amplifier U60B are coupled resistors R176 (4.02 KΩ) and pull-down resistor R177 (49.9 KΩ).

At the output of amplifier U60B are resistors R186 (4.99 KΩ) with shunt resistor R185 (16.98 KΩ) and RC circuit C206 (0.01 µF) and R184 (22 KΩ). The output of admittance circuit Y1 provided the non-inverting input of amplifier U60D of summing node 186.

The composition of admittance circuit Y1 in this embodiment and the selection of the parameters therefor is a factor which is implemented based on the design constraints of the metallic test system at the local or central office end of the system. For example, in one embodiment, the system is designed such that metallic extension is optimal when the signal is in a range of DC to 200 Hz. At high impedance and at low frequency, Y1 appears as an open circuit. Y1 essentially appears as a capacitance in series with an inductance. Other configurations and implementations of the office unit modules, and admittance Y1, are possible and will vary with the particular design constraints of the system and test system.

FIG. 14 also shows one embodiment of the implementation of current shaping circuit 149 and voltage shaping circuit 148. Voltage shaping circuit 148 comprises capacitors C201 (0.01 µF) coupled in series to the inverting input of amplifier U57D. Resistor R187 (85.6 KΩ) is coupled in parallel with C201/R170 and itself coupled in series with a series RC circuit comprised of C202 (0.01 µF) and R172 (953 Ω) in parallel with resistor R171 (38.3 KΩ). Resistors R167 (69.8 KΩ) and R168 (18.7 KΩ) are coupled in the feedback path of amplifier U57D. The shaping circuit 148 taps the output of voltage follower amplifier U60A and passes it to summing amplifier U57D.

The voltage shaping circuit comprises series resistors R165 (121 KΩ) and R166 (1 KΩ), coupled in parallel with resistor R164 (75 KΩ) and capacitor C200 (0.03 µF) coupled to the output of summing node 186. The output of summing node 186 further comprises the TIP_VOLT_IN signal to the office unit module Tip current source 140. Summing amplifier U57D takes the outputs of voltage shaping circuit 148 and current shaping circuit 149 at the inverting input, with resistors R167 and R168 providing a feedback path.

The TIP_VOUT signal is provided to the anti-alias filter 156.

Figure 15:
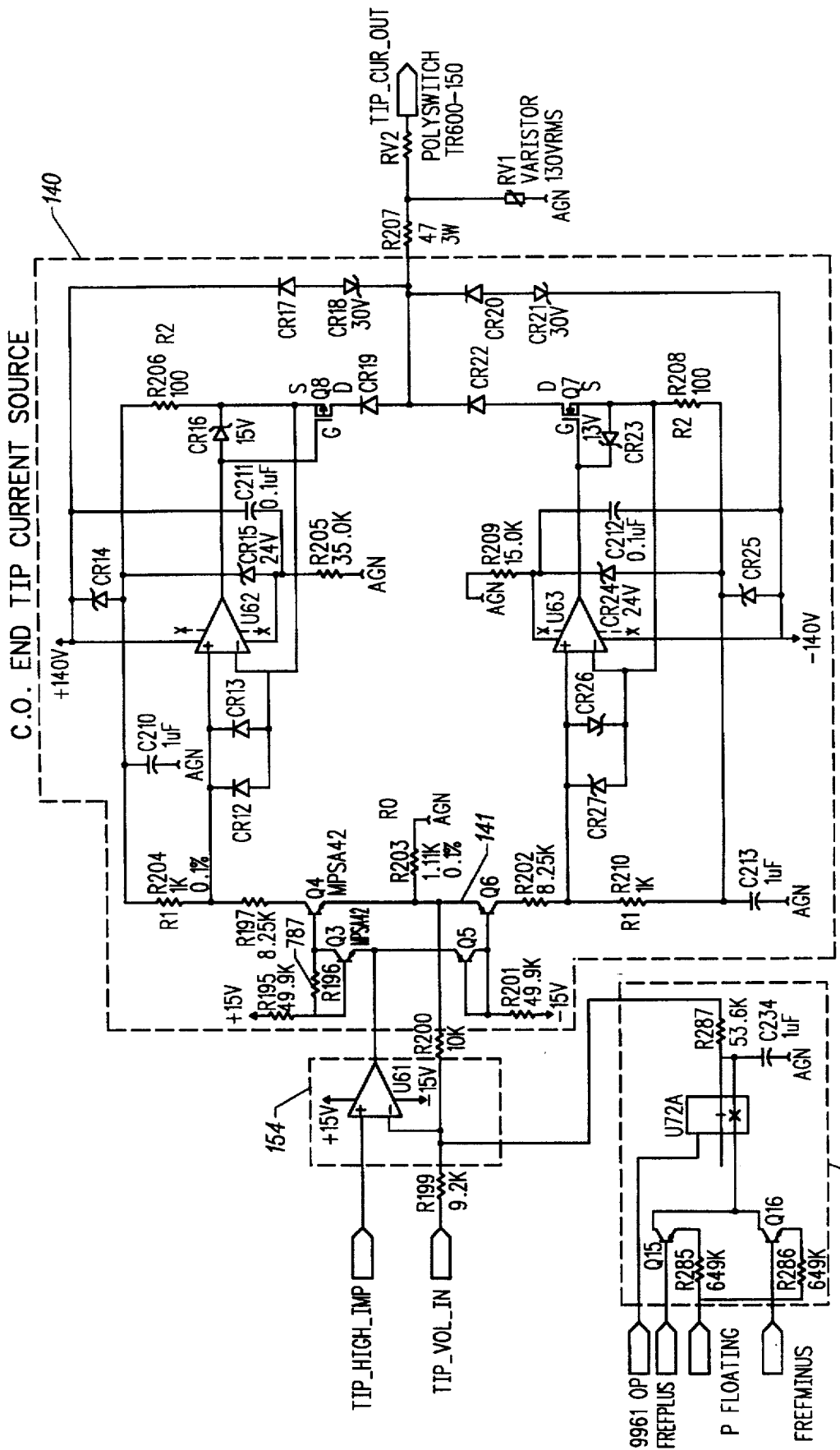
FIG. 15 is a schematic diagram of the near-end tip current source represented in FIG. 14.

FIG. 15 shows one embodiment of an implementation for the office unit Tip current source 140 and anchor circuit 135.

Anchor circuit 135 comprises switch U75A and complementary bipolar transistors Q15 and Q16. Anchor circuit 135 utilizes the TIP_FLOATING input, which is supplied from the output of amplifier U60A, which also supplies admittance circuit Y1. It should be noted that the output of amplifier U60A is itself supplied from a tap between resistors R162 and R183 and hence the TIP_FLOATING signal is a feedback from the output of Tip current source 140. The TIP_POWER_OUT signal is coupled to the load connector 114. The office unit Tip current source 140 also receives the FREF minus and FREF plus reference signals for the anchor circuit 135. The TIP_HIGH_IMP signal is taken from a tap between resistors R163 and R183 (in FIG. 14).

As shown in FIG. 15, the FREF minus and FREF plus signals are input to bipolar transistors Q15 and Q16 which, depending on the state of the TIP_FLOATING signal, provide a high impedance as the voltage at terminal 114 approaches 75 volts. The high impedance is provided by the floating voltage level at terminal 114 via resistors R285 and R286 (both 694 KΩ) which are coupled to the collectors of transistors Q15 and Q16. Switch U72A is enabled by the 9961_OP signal which provides the high impedance load to the TIP_VOL_IN summing node 154 terminal via resistor R287 (53.6 Ω).

The input of the central office Tip current source 140 comprises summing node 154, also shown in FIG. 11. Summing node 154 comprises amplifier U61 having a non-inverting input coupled to the TIP_HIGH_IMP signal and an inverting input coupled to the TIP_VOL_IN signal.

Amplifier U61, with transistors Q3-Q6 comprise a balanced, inverting voltage-to-current converter. For negative input voltages at TIP_VOL_IN, a current results, flowing in the collector of Q4, resistor R197 and resistor R204, defined by the input voltage multiplied by R200/(R199*R201). Since amplifier U62 is a non-inverting, unity gain voltage amplifier, the voltage across R204 is transferred to R206, resulting in a current gain defined by the ratio of R204/R206. That same current flows in the source and drain of transistor Q8 and, in turn, as a positive output current at TIP_CUR_OUT. Similarly, for positive input voltages at TIP_VOL_IN, there results a current flowing in the collector of transistor Q4, resistor R197 and resistor R204 defined by the input voltage multiplied by R200/(R199*R201). Since amplifier U63 is a non inverting, unity gain voltage amplifier, the voltage across resistor R210 is transferred to resistor R208, resulting in a current gain defined by the ratio of R210/R208. That same current flows in the source and drain of transistor Q7 and in turn as a negative output current at TIP_CUR_OUT.

The TIP_HIGH_IMP signal at the positive input of amplifier U61 provides a small positive feedback signal which compensates for the shunt resistors, R162, R183, R163, at the output. (See FIG. 14).

Since the circuit is powered by a ±140 volt supply, the current at TIP_CUR_OUT is maintained proportional to TIP_VOL_IN for voltages at the output ($V_A$, as shown in FIG. 11) up to approximately ±140V.

Talk Sense Circuit

FIG. 16 is a schematic diagram of the talk sense circuit 400 which is coupled to both the Tip and Ring circuits.

The purpose of the talk sense circuit is to identify conditions on the test circuit indicating the presence of a talking condition. Under certain circumstances, it is necessary to allow voice transmission hardware to couple to the Tip and Ring connection at the local end and remote end. The signal (TALK_SENSE), output of comparator U07, will be high when the conditions are met. There are two conditions required to identify the presence of a talking condition: first, the absolute value of DC current sensed in the RING lead must be greater than approximately 10 mA. (sensed by amplifiers U74A and U68D and associated components) and, second, that the current in TIP AND RING circuits are approximately equal and opposite (sensed by comparator amplifiers U68A, U68B, U68C and associated components.) The above conditions are based on the assumption that testing results in unbalanced or smaller, short duration, balanced currents.

The Tip and Ring talk sense signals (TIP_TALK_SENSE, RING_TALK_SENSE) are input to resistors R266 (60.4 KΩ) and R267 (60.4 KΩ), which sum the signals at the input to amplifier U68A. U68A, with feedback components C230 (1 µp) and R268, (301 KΩ) filters the summed signal before passing it on to the comparators which follow. The output of amplifier U68A will be a small voltage if current flow in the Tip and Ring circuits is equal and opposite. If that condition is not present, then the output of comparator U68B or comparator U68C will be positive, forward biasing CR52 or CR51, and thereby causing the output of comparator U70 to be low (talk mode inhibited).

The Ring talk sense signal (RING_TALK_SENSE) is also input through resistors R276 (604 KΩ) and R279 (19.6 KΩ) which function with amplifier U74A and associated components as an absolute value (full wave rectifier) circuit. The signal is filtered by the combination of resistors R276, R277 and capacitor C229 (22 µp) before being input to comparator U68D. The reference voltage at the positive input of U68D is selected so that DC TIP current in excess of approximately 10 mA. results in a low output.

Comparator U70 (TALK_SENSE) will be high, indicating a talking condition, only if the outputs of comparators U68B, U68C and U68D are all negative.

Metallic Test Extension Modules—Remote

Figure 17:
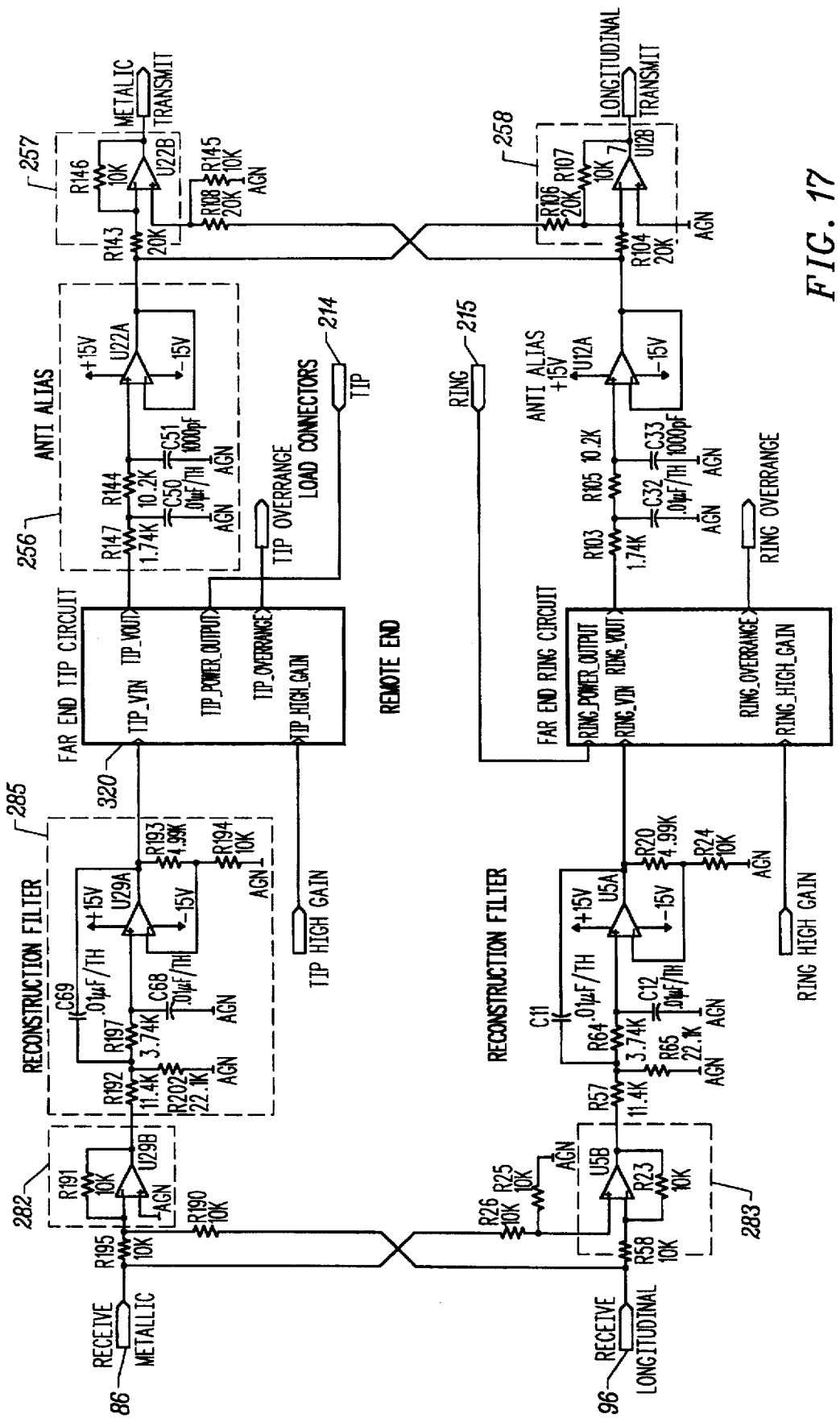
FIG. 17 is a schematic diagram of the remote end metallic test extension remote unit shown in block form in FIG. 13.
Figure 18:
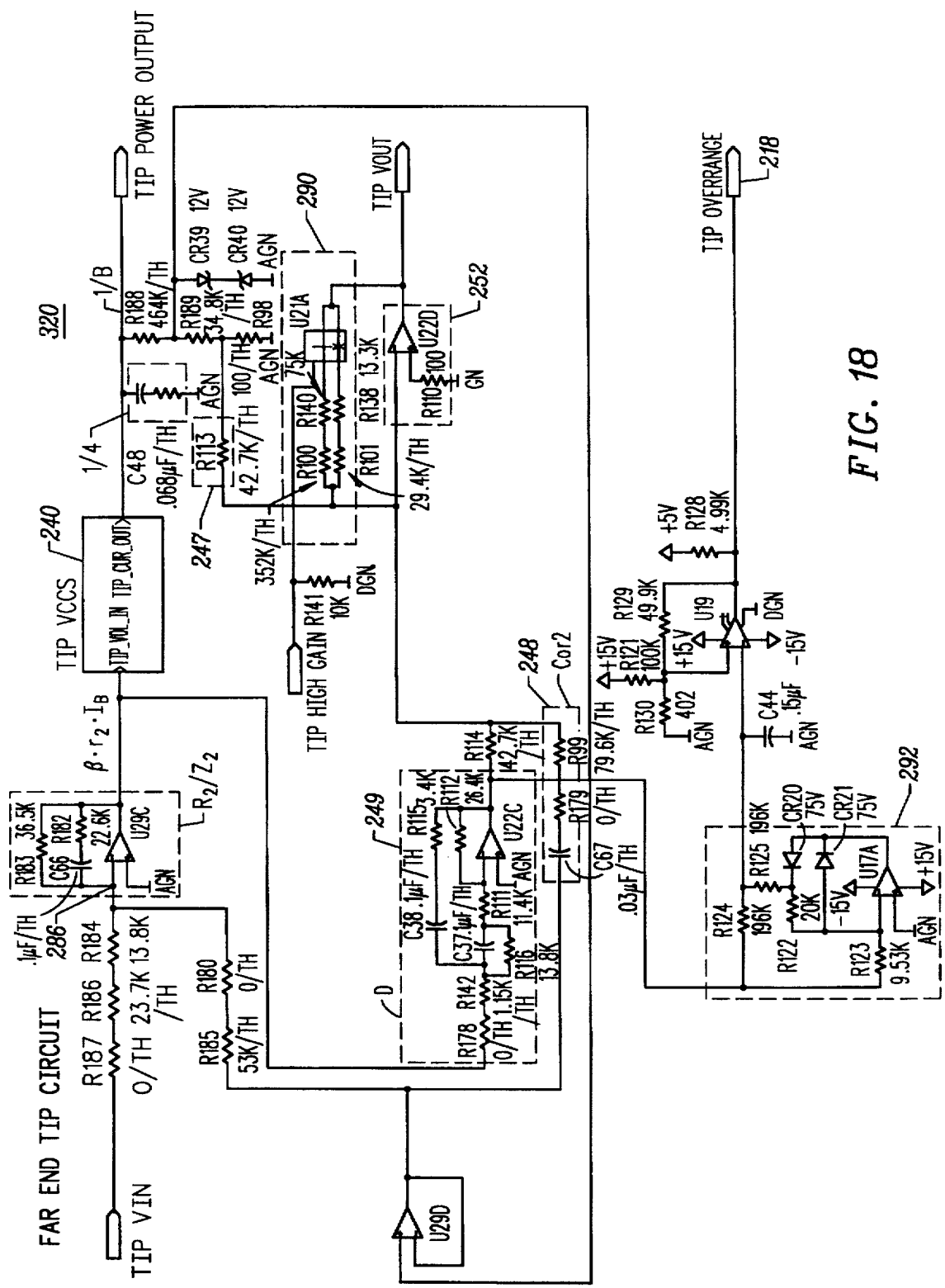
FIG. 18 is a schematic diagram of the remote end tip circuit shown in FIG. 17.
Figure 19:
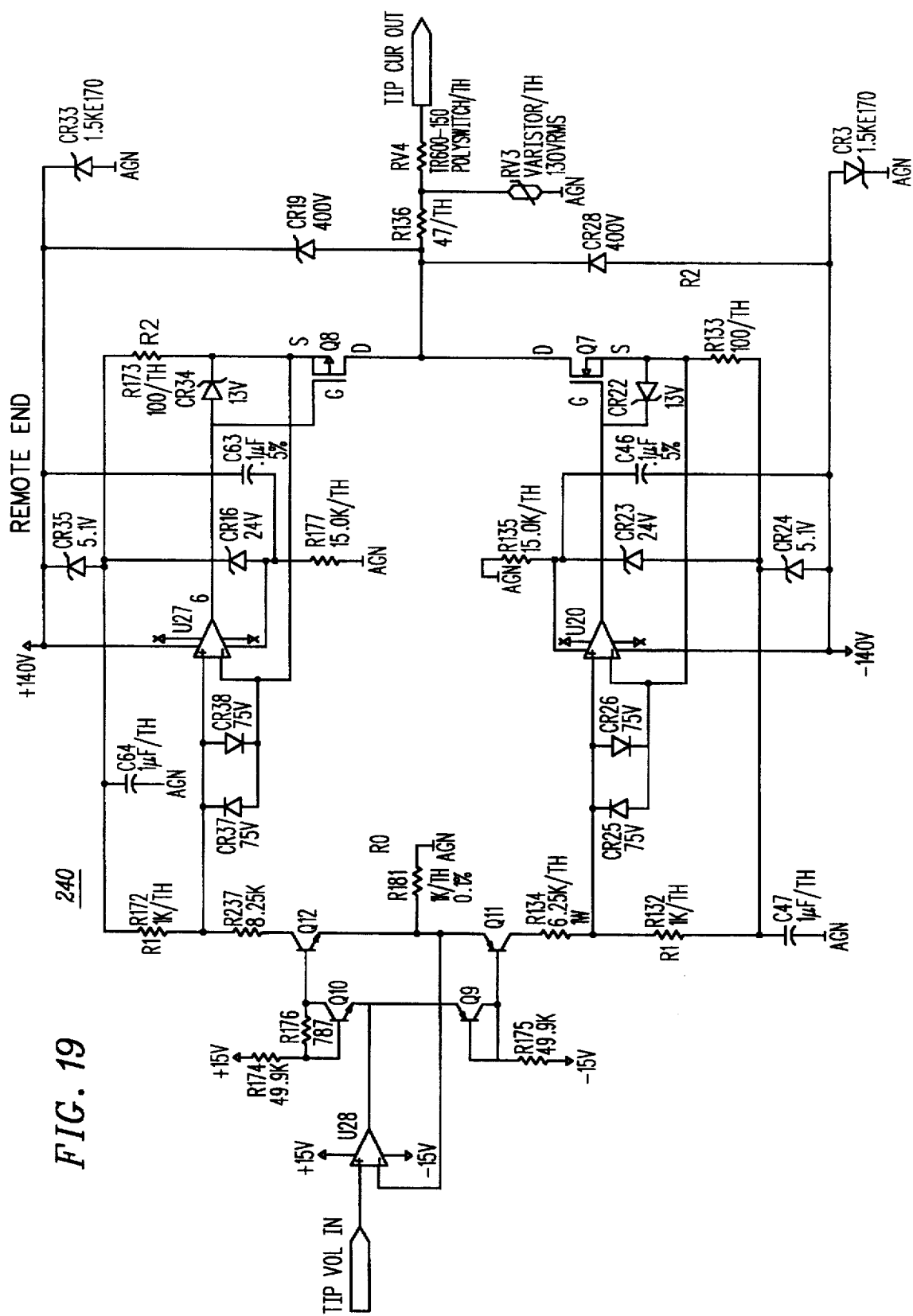
FIG. 19 is a schematic diagram of the voltage controlled current source shown in block form in FIG. 18.

FIGS. 17–19 are schematic diagrams illustrating an implementation of one embodiment of the metallic test extension remote module shown in block form in FIG. 12.

FIG. 17, like FIG. 13, shows both the Tip and Ring circuits of the remote end module 202. Because the Tip and Ring circuits are equivalent, only the Tip circuit components are described in detail, while the Ring circuit components are described to the extent necessary to illustrate areas of interaction between the circuits. Moreover, certain filter elements have configurations and implementations which, in this embodiment, are identical to those described with respect to the office unit module in FIG. 13. For brevity, the description is not duplicated.

The METALLIC_RECEIVE and LONGITUDINAL_RECEIVE signals at terminals 86 and 96 are coupled to the delta modulation digital-to-analog decoders 271 and 272 (shown in FIG. 12). Summing nodes 282 and 283 comprise the sum and subtract circuitry for decoding the metallic and longitudinal signals into Tip and Ring signals. Summing nodes 282 and 283 have a similar configuration to the nodes previously discussed with respect to the office unit end module, and comprise amplifiers U29B and U5B coupled in an inverse manner to amplifiers U57B and U59B, respectively, shown in FIG. 13.

Reconstruction filter 285 (and the corresponding Ring circuit reconstruction filter) have a structure and function similar to reconstruction filter 185, shown in FIG. 13. As detailed in FIG. 17, the only change is in the value of resistors R192 (11.4 KΩ) and R202 (22.1 KΩ), which differ slightly from their counterparts: resistors R124 (10 KΩ) and R102 (23.4 KΩ). Anti-alias filter 256 (and the corresponding Ring circuit anti-alias filter) have a configuration which is essentially identical to anti-alias filter 156 shown in FIG. 13.

Summing nodes 257 and 258 are configured as sum and subtract circuitry in a manner which is equivalent to nodes 157 and 158 to convert the Tip and Ring signal to metallic transmit and longitudinal transmit signals for transfer to the digital-to-analog converters 261 and 262.

Also shown in FIG. 17 are the load connectors 214,215 which, in one embodiment, receive the Tip and Ring signals from the remote unit test bus switching module 295.

FIG. 18 shows one implementation of the remote unit module Tip circuit 320 shown as a block in FIG. 17. It should be understood that circuit 320 is equivalent to the remote unit Ring circuit shown in FIG. 17.

Shown in FIG. 18 is the schematic detail for the summing node 286, frequency shaping amplifier circuit 258, admittance circuit Y4, current shaping circuit 249, voltage shaping circuit 248, and high impedance compensation circuit 247. Autoranging circuit 290 is also shown.

The Tip input voltage TIP_VIN, after conversion by the sum and subtract circuitry 282,283, and filtering by reconstruction filter 285, is indicative of voltage $V_0$ which is input to anti-alias filter 156 in office unit module 102a. Summing node 286 combines the Tip input voltage from the office unit end with a feedback signal tapped from the output of the voltage controlled current source 240 shunted with the Y4 admittance and divided by resistors R188 (464 KΩ) and R189 (38.4 KΩ). A voltage follower amplifier U29D is coupled in the feedback path.

The frequency shaping amplifier circuit 258 comprises resistor R183 (36.5 KΩ) coupled in parallel with the series coupling of capacitor C66 (0.01 µF) and resistor R182 (22.6 KΩ). These are coupled in the feedback path of the inverting input of amplifier U29C.

The scaling factor β is contributed by resistors R188 and R189 and hence the output of summing node 286 and the frequency shaping amplifier circuit 258 will be a voltage defined as $\beta r_2 I_B$. This signal is provided to the TIP_VOL_IN of the remote unit voltage controlled current source 240 and to the current shaping circuit 249.

Current shaping circuit 249 is supplied with the output of summing node 286, and provides its output to summing node 252. It also provides a control signal to autorange circuit 292 which allows autorange circuit 242 to control the autorange function in both the remote unit and office unit modules.

Current shaping circuit 249 comprises resistor R142 (1.15 KΩ) coupling series with capacitor C37 (0.01 µF) and resistor R111 (11.4 KΩ) coupled to the inverting input of amplifier U22C. Resistor 116 is coupled in parallel with capacitor C37 (0.01 µF), and capacitor C38 (0.01 µF) and resistor R115 (3.4 KΩ) are coupled along feedback path between the output of amplifier U22C and capacitor C37. Resistor R112 is coupled between the output of amplifier U22C and the inverting input of amplifier U22C.

The output of amplifier U22C is provided to the overrange detection circuit 292 which serves as a control portion for the autoranging circuit 290 on the remote end and the autoranging circuit 190 at the office unit end in the system. Overrange detect circuit 292 is actually a current rectifier which provides a Tip overrange signal (TIP_OVERRANGE) to the control module 116.

Voltage shaping circuit 248 comprises capacitor C67 (0.03 µF) in series with resistor R99 (79.6 KΩ).

The high Z compensation circuit is comprised of resistor R113 (42.7 KΩ) which is coupled between resistors R189 and R98 and the input of autorange circuit 290.

Autorange circuit 290 is a configuration similar to autorange circuit 190. The TIP_HIGH_GAIN signal selects between the high impedance or low impedance modes by enabling one of two conduction paths of a resistor network comprised of R100 (352 KΩ) and R101 (29.4 KΩ) in series with resistor 138 (13.3 KΩ).

Summing node 152 comprises amplifier U22D which sums the voltages from current shaping circuit 249, voltage shaping circuit 248 and high Z compensate resistor R113. The TIP_VOUT signal is provided to anti-alias filter 256 shown in FIG. 17.

FIG. 19 shows the composition of the remote unit voltage controlled source 240, which is shown in block form in FIG.

18. As shown in FIG. 19, the voltage controlled current source is a configuration which is essentially identical to the office unit current source, except that the offset current adjustment provided by the FREF plus and FREF minus signals is not utilized.

System Multiplexing

FIGS. 20–23 illustrate the metallic test extension office unit and remote unit multiplexing and framing functions implemented in the multiplexers 150 and 250.

Figure 20:
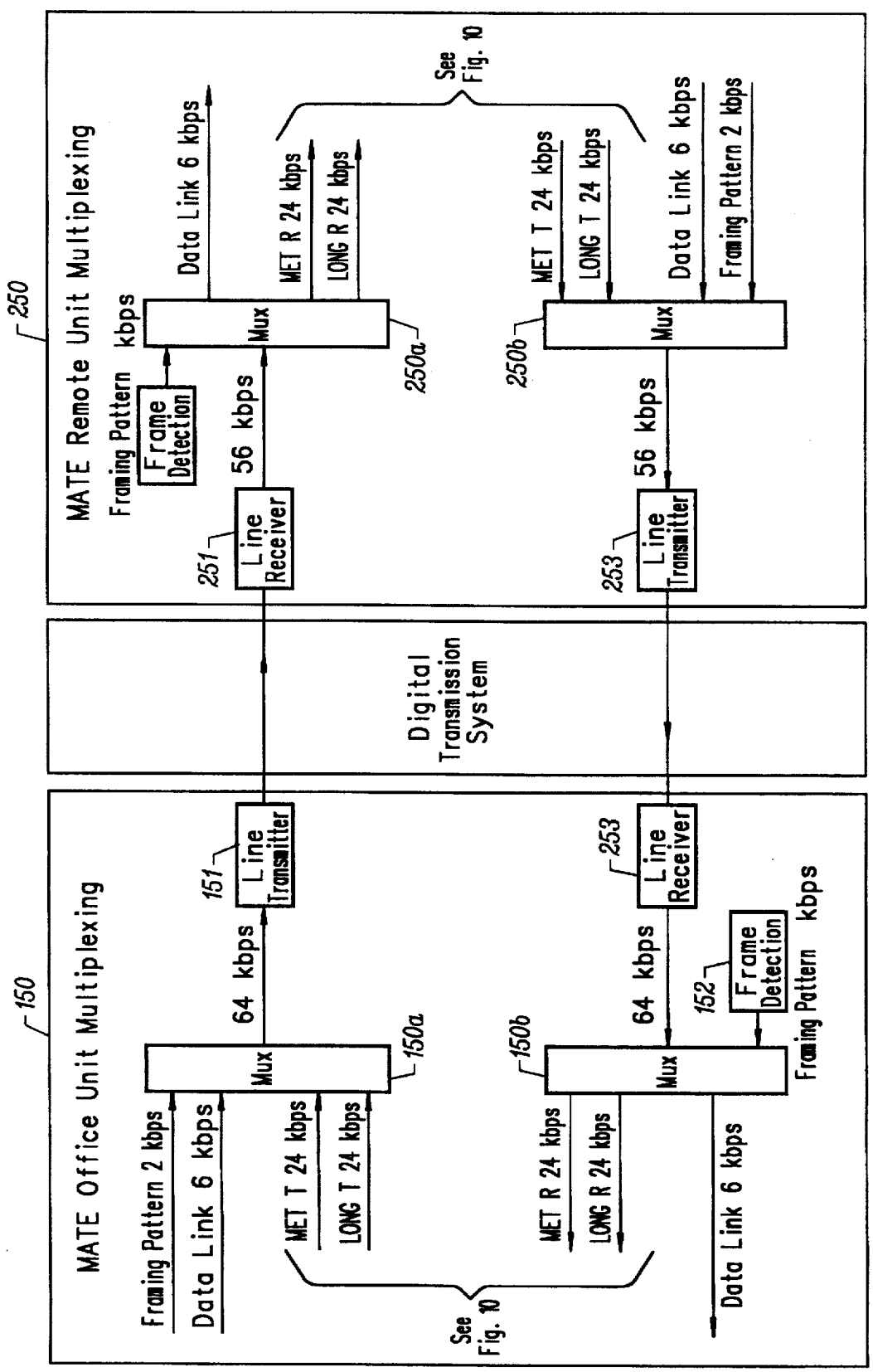
FIG. 20 is a block diagram illustrating the multiplexing and framing functions performed at the office unit and remote terminal units in the system of the present invention

As shown in FIG. 20, the metallic and longitudinal signals to be transmitted from office unit module 102 to remote unit module 202 exit the delta modulation encoders 160 at a data rate of 24 Kbps each. As explained with respect to FIG. 23, the signals enter a variable delay shift register that allows the delta modulation encoders and decoders at the respective office unit and remote unit to be separated by a fixed delay. The signals are provided to multiplexer 150a which combines the signals with a framing pattern (requiring 2 Kbps) and a control word (or data link) requiring 6 Kbps. The transmitted signal exits MUX 150a with a total data rate of 64 Kbps. However, as illustrated in FIG. 21, only 56 Kbps of this signal is utilized—the last bit in each 8 bit frame of data is dropped since the remote terminal data port may be limited to the 56 Kbps rate. Line receiver 251 at remote module MUX/frame 250 receives the bipolar loop rate signal, recovers the clock and extracts the 56 Kbps signal. As explained with reference to FIG. 21, the output of the line receiver is a 56 Kbps data stream which corresponds to the standard data port in most DLC systems. The framing pattern is extracted by frame detect circuitry 252. De-multiplexer 250a extracts the data link control signal, and the metallic and longitudinal received signals.

In similar fashion, metallic and longitudinal signals returning from the remote unit are passed through multiplexer 250b and combined with a control word and framing pattern equivalent to the pattern implemented at the office unit end by multiplexer 150a. The output 56 Kbps signal is provided to a line transmitter for transmission through the digital transmission system to a line receiver 153 in the office unit multiplexer 150. Office unit multiplexer 150 includes a line receiver which passes the received transmission to frame detection circuitry 152 and de-multiplexer 150b. De-multiplexer 150b extracts the returning metallic and longitudinal signals, and the control signal data link.

Figure 22:
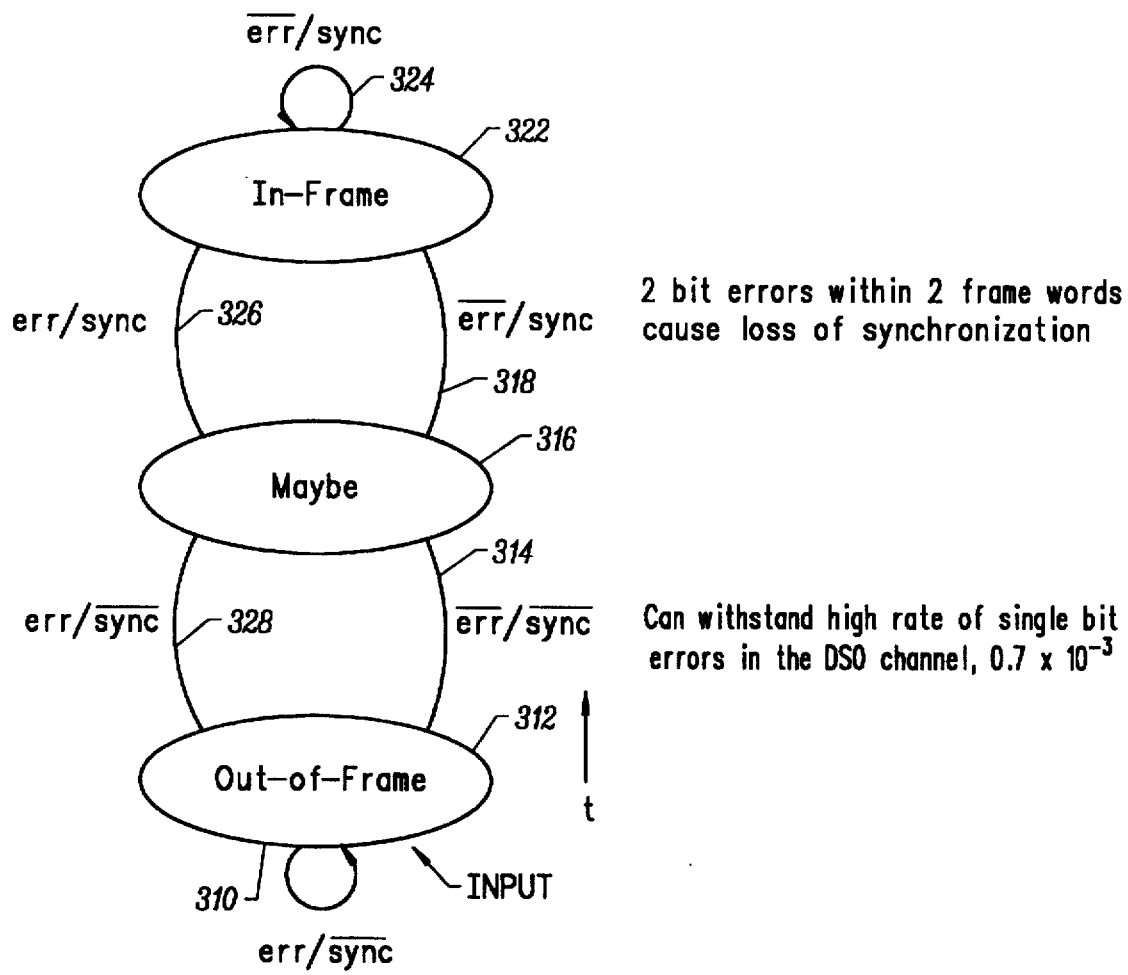
FIG. 22 is a flow diagram illustrating the framing algorithm used by the controller of the system of the present invention.
Figure 23A:
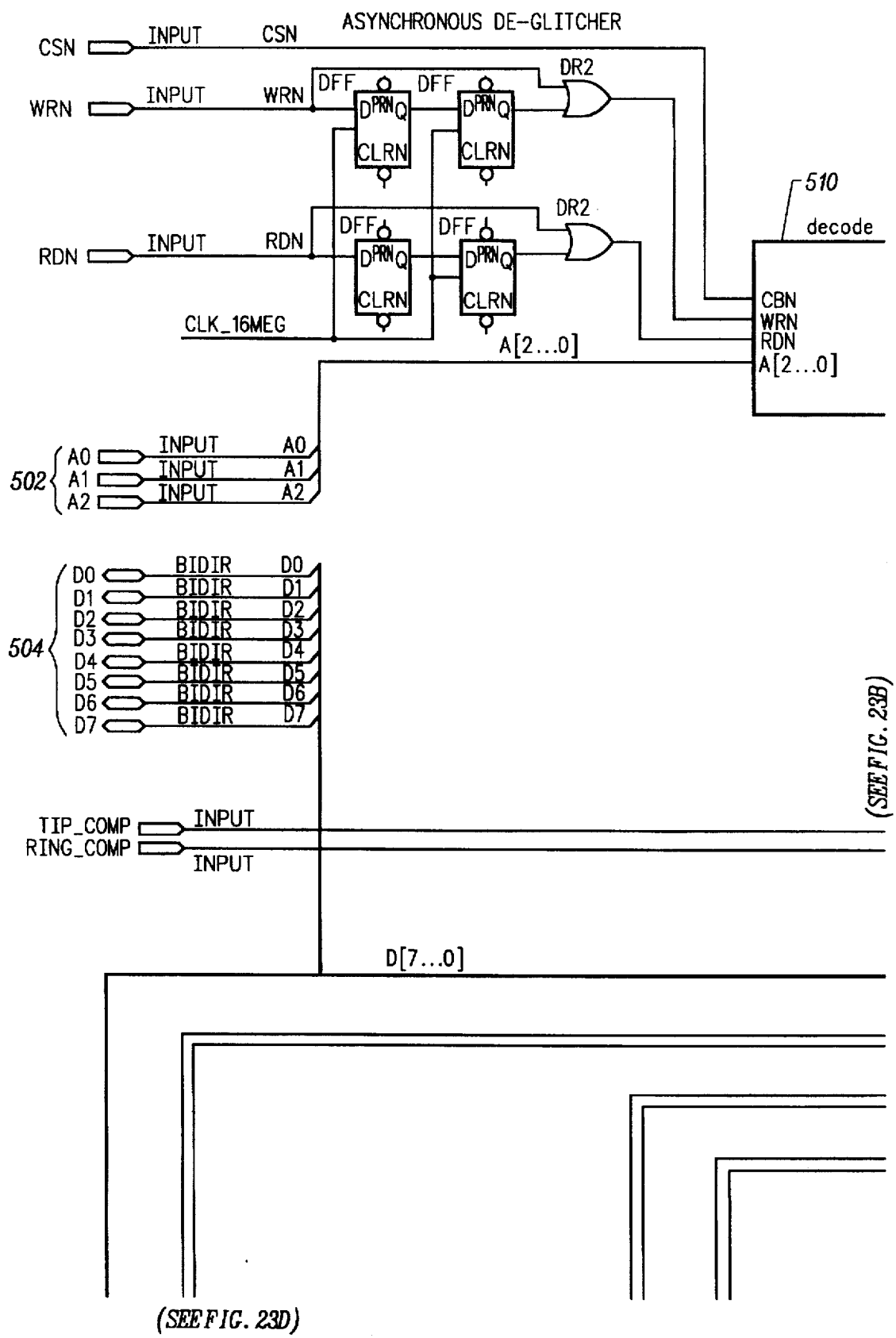
FIG. 23 is a block diagram of a field programmable gate array device used in one embodiment of the system to implement the framing and multiplexing functions.
Figure 23B:
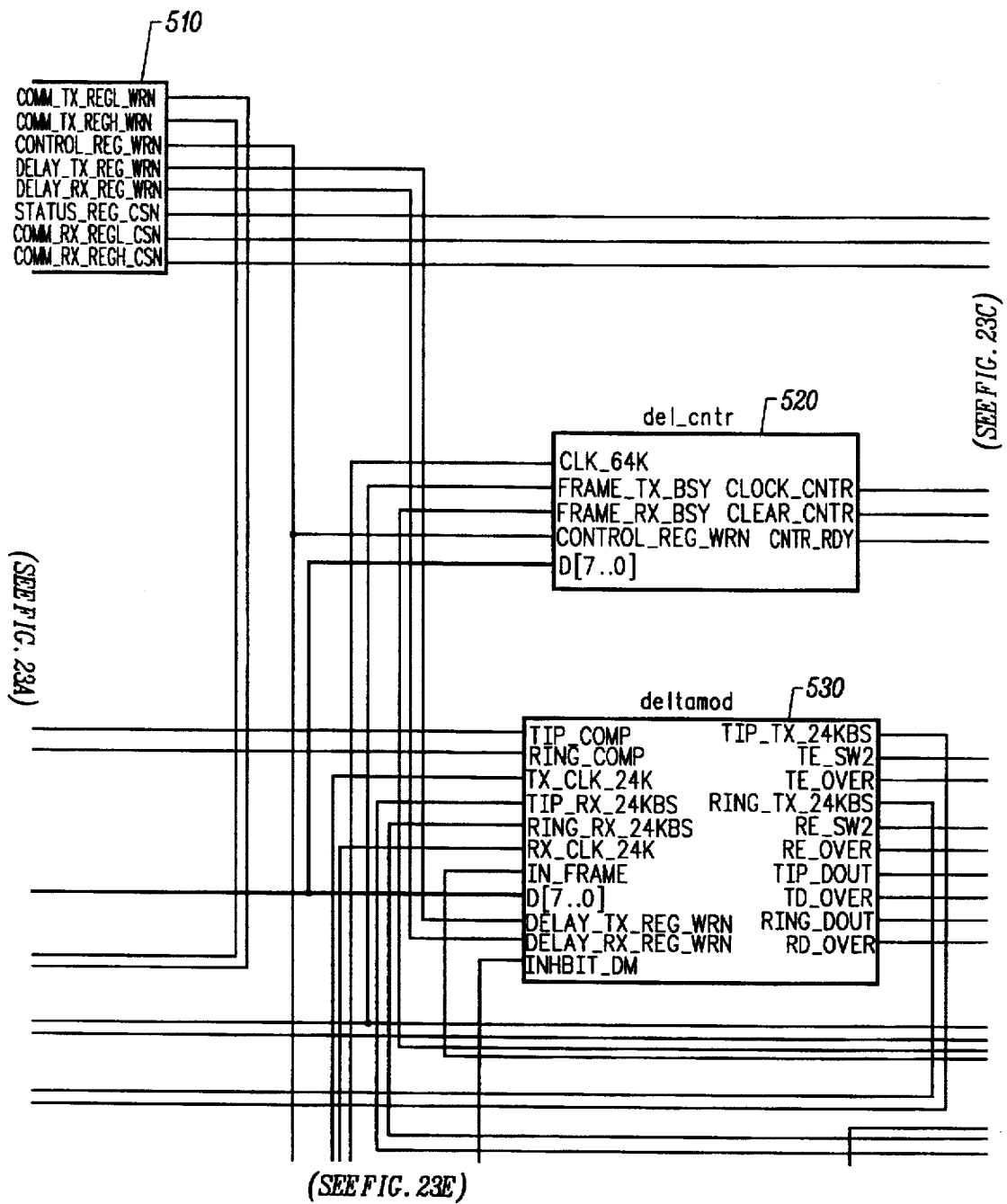
Figure 23C:
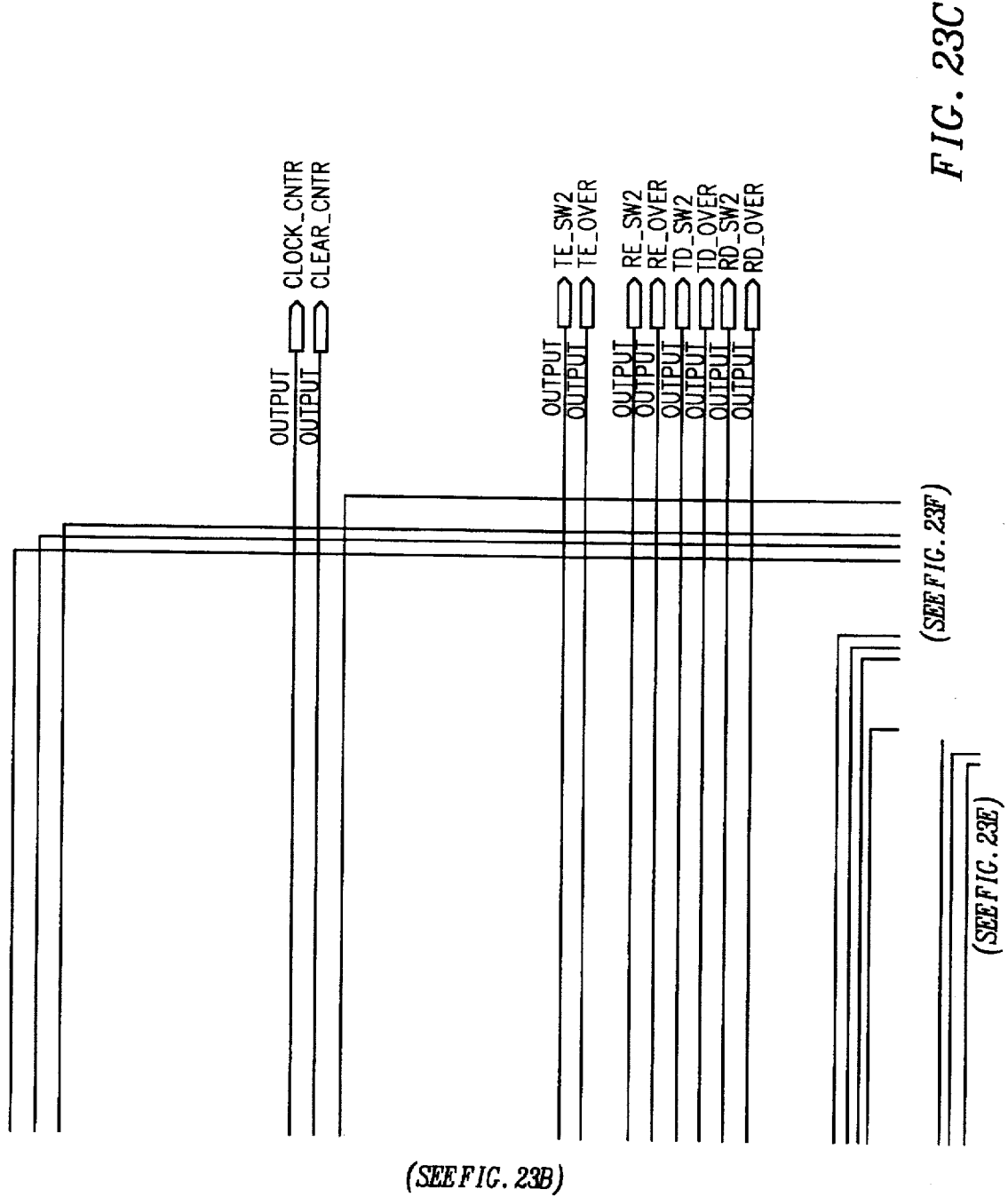
Figure 23D:
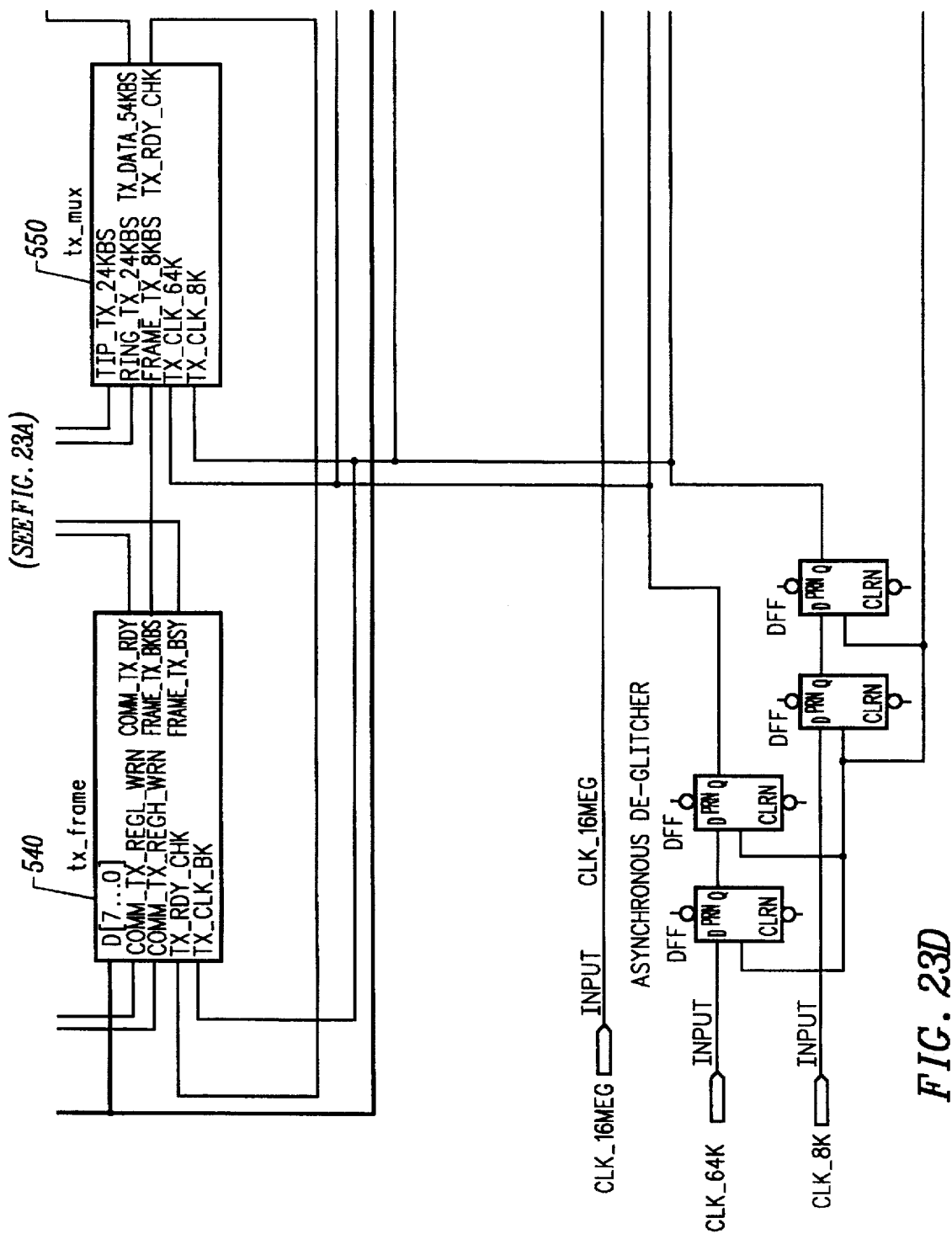
Figure 23E:
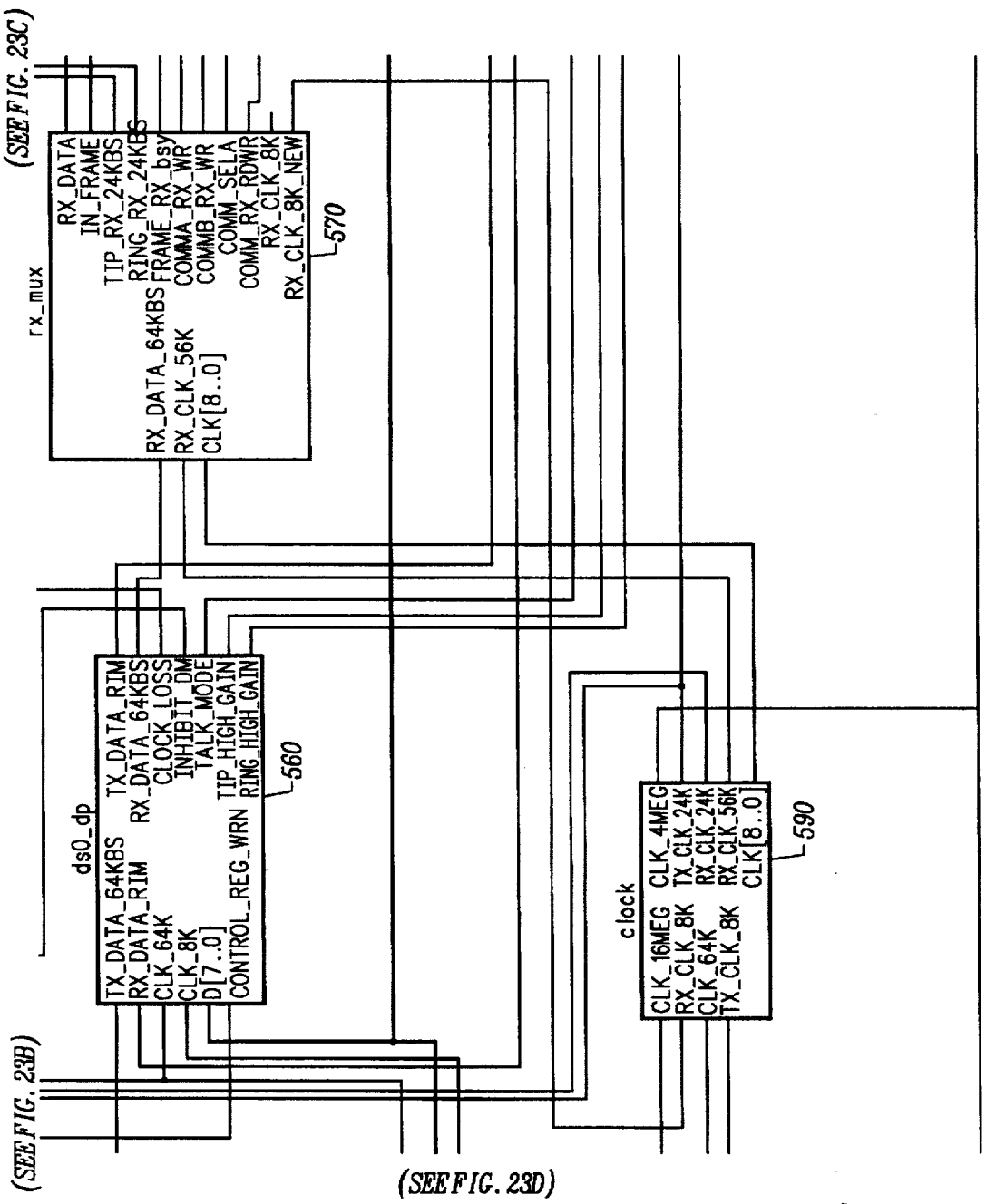
Figure 23F:
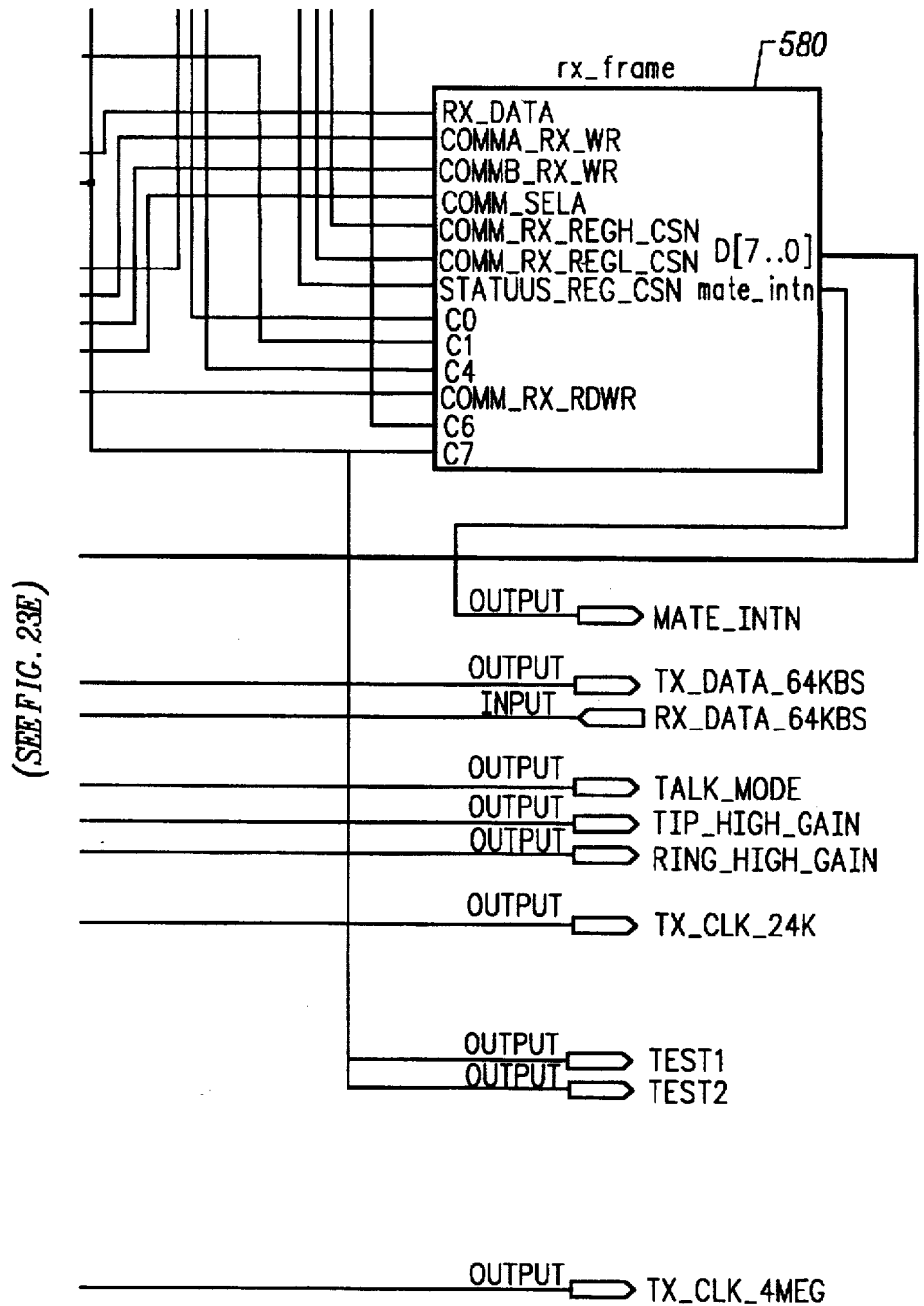

FIG. 21 shows the framing pattern utilized in the system of the present invention. The 64 Kbps channel supports a data word length of 8 bits, but the metallic test extension unit uses only 7 bits rather than the 8 bits, resulting in the lower 56 Kbps data rate. One bit in each 8-bit word is the C bit used in standard digital services circuits. The data pattern shown in FIG. 21 is transmitted horizontally row-by-row. The first bit of each row constitutes the framing pattern which is sought by the framing detection circuitry as shown in FIG. 22. Each column then includes the Tip and Ring signal data (in the form of metallic and longitudinal data) transmitted from the delta modulation encoders. The first bit in each of columns 2, 3 and 4 comprises control words for the remote unit. Control words C-1 through C-3 generally comprise integer numbers which indicate, to the remote unit, the source, destination, and contents of the control message. Therefore, for every 7 bits sent at 8 Khz, 3 bits are for the metallic delta modulation encoded data and 3 bits are for the longitudinal delta modulation encoded data. The resultant bit rate to the delta modulation encoders and decoders is then 24 Kbps each. The remaining bit is used for the 8 bps framing and control path.

Control flags are also illustrated in FIG. 21. Flags in the transmission direction are set when the last bit of that pattern has been sent out, and are cleared when the next data word has been written by the microprocessor. Flags in the receive direction are set when the last bit of that pattern has been received, and are cleared when the microprocessor receives the data word.

FIG. 22 shows the framing detection algorithm utilized for metallic test extension synchronization in the present invention. At step 312, the algorithm is in the out-of-frame state and when the input data stream is received, if errors are detected, the system remains out of sync and in the out-of-frame state as shown by loop 310. The moment that no errors are detected, as shown on line 314, the system will still be considered out of sync and proceed to the conditionally framed state. At this state, at least one framing pattern will have been received without errors, but the algorithm does not consider the system to yet be in sync. Since no errors are detected, the system will await a second error-free framing pattern at step 316. If no errors are detected, the algorithm will consider the system synchronized, and at step 318, the algorithm will move to the in-frame state at step 322. The system will remain in the in-frame state 322 as long as there are no errors and the system is in sync, as illustrated by loop 324. The moment an error is detected in the framing pattern, as shown in line 326, the algorithm will still consider the system in sync, but will require that the next framing pattern be received error-free, waiting at the conditionally framed state block 316. If error-free framing is not detected in the following frame at line 328, the system will move to the out-of-frame state and generate an error signal. Thus, at least one bit error within each of two successive frame words are required for a loss of synchronization: A single error in a single frame will not cause a loss of synchronization. This allows the algorithm of the present invention to withstand a high rate of single bit errors within the DS0 channel on the order of $7 \times 10^{-2}$ bit errors per total bits.

FIG. 23 shows a block level diagram of the field programmable gate array (FPGA) device utilized in the MUX/framer circuit 150 in the office unit system shown in FIG. 11. The framer/multiplexer 250 in the remote unit module has a generally equivalent implementation and hence, for brevity, only the description of the office unit FPGA is set forth.

The block logic diagram of the FPGA illustrates one embodiment of the implementation of the multiplexing function in the system of the present invention. Shown in FIG. 23 are address decoder 510, delay counter 520, delta modulation post processor 530, transition framer 540, transition signal multiplexer 550, DS0 DP 560, receive signal multiplexer 570 and receive signal deframer 580. A clock module 590 is also provided to generate clock signals which are not supplied by the units connections with the central office terminal.

Address bus 502 and data bus 504 couple the FPGA to the controller module 116. The chip select CSN input and read enable (RDN) and write enable (WRN) signals are coupled via clocked latches to address decoder 510. Address decoder 510 is coupled to the elements of the FPGA and controls data input/output of each of the elements in accordance with well-known principles.

A back plane connector (not shown) couples the entire metallic test extension office unit module to the office unit and central office terminal (in a DLC). The central office terminal provides an 8 KHz cycle clock (CLK_8K), a 64 KHz clock (CLK_64K), and a 16 MegHz clock (CLK_16 MEG). Clock generator 590 utilizes these signals to generate other required clocks for the MUX/framer circuit 150. These clocks include the 4 MEGHz clock and the 24 KHz transmission and receive clocks (TX_CLK_24K), (RX_CLK_

24K) utilized for the framing algorithms, and the 56 KHz clock utilized for the receive multiplexing block 570.

The metallic test extension system architecture uses a fixed delay buildout scheme to achieve a constant line length. Delay is introduced into the system during the analog-to-digital and digital-to-analog conversion. Delay counter 520 is an interface circuit which counts the delay and provides it to a counting register which is external to the FPGA. Since the data rate of the DS0 interface is set at 64 Kbps, the number of bits of the delay in the channel can be determined by comparing the actual transmission time of a signal against a direct loop back of the signal, and counting the number of bits in the delay to determine the delay time period.

DS0_DP logic count 560 implements the loop back function for the counter by selectively switching in a direct connection between its TX_DATA_64 KBS input and RX_DATA_64 KBS output. A corresponding remote unit loop back can be provided for the received data (RX_DATA_RIM) which is passed to the output TX_DATA_RIM TX_DATA_64 KB and receive multiplexer 570. The transmit data (TX_DATA_64 KBS) is normally coupled directly to the output TX_DATA_RIM, and RX_DATA_RIM is normally coupled to RX_DATA_64 KBPS.

Delta modulation processor 530 provides the actual delay insertion into the Tip and Ring transmit signals. The TIP_COMP and RING_COMP inputs thereto are the metallic and longitudinal signals which are output from the summing and subtract nodes 157 and 158 via delta modulation encoders 161 and 162. Delay is added to the digitized signals to achieve the fixed delay by adding in the difference between the fixed delay and the actual delay counted by delay counter 520. Delta modulation processor 530 includes two variable length shift registers to implement this function based upon the data for the delay to be added to the encoders, supplied via the data bus by delay counter 520. The resulting output is provided on the TIP_TX_24 KBPS and RING_TX_24 KBPS outputs. In addition, the receive Tip and Ring signals require decoder delay insertion. The RING_RX_24 KBPS and TIP_RX_24 KBPS signals from the remote unit are supplied to two additional variable length shift registers which insert the decoder delay and supply the TIP_DOUT and RING_DOUT signals. Overload detection logic is included which senses an overload of the incoming and outgoing 24 KBPS signals relative to the 24 KHz clock.

Transmission framer logic circuit 540 provides an 8 Kbps frame pattern to transmission multiplexer 550 which adds the 8 kbs of framing pattern, 8 kbs of unused bits, and the two 24 kbs of Tip and Ring signals to provide the 64 KBPS signal. In addition, the control path for the remote unit may be provided on data bus 564 in the form of an 8-bit word (up to 3 words) and multiplexed into the framing pattern. The transmission framer includes address control inputs COMM_TX_REGL_WRN and COMM_TX_REGH_WRN for address decoder 510, a clock input TX_CLK_BK and a "ready" input TX_RD4_CLK from transmission MUX 550.

The transmission multiplexer 550 receives the 24 KBS signals from the delta modulation post processor 530 (TIP_TX_24 KBS, RING_TX_24 KBS) (including delay) and provides the transmission data output signal (TX_DATA_64 KBS) to the DS0_DP.

Likewise, data which is received from the delta modulation decoders (RX_DATA_64 Kbs) is provided to the DS0 DP and the receive multiplexer 570. The receive multiplexer demuxes the received control path data (RX_DATA), applies the framing algorithm to search for the framing pattern, and extracts the Tip and Ring data (TIP_RX_24 Kbs, RING_RX_24 Kbs) and provides it to the RX framer 580.

Receive framer 580 is a holding register for communication channel data which is to be provided on the data bus. It includes general status indication registers and the Tip/Ring receive data holding registers. The received data framing circuit 580 also includes a microcontroller interrupt line (mate_intn).

Application Example: Single DS0 Channel per Metallic Test Extension Unit

FIG. 24 illustrates the system of the present invention in a general form useful with respect to illustrating an alternative embodiment of the present invention shown in FIG. 25. Because the DS0 interface (or other standard interface) of the central office terminal is used, the central office specials test bus or bypass pairs are input to metallic test extension units or multiplexers, respectively, and a small number of metallic test extension units can serve a large number of remote terminals. In this case, multiple remote terminals are served by individual metallic test extension units, and the system shared resources are optimized.

FIG. 25 illustrates, in very general form, implementation of a combined special services and POTS test system using external metallic access test extension (MATE) units. FIG. 25 illustrates an embodiment, wherein an individual MATE or MATE module is associated with each central office terminal. The bypass pairs could be coupled directly to the MATE to implement POTS testing only. As shown in FIG. 25, in accordance with the principles of the present invention, the Tip and Ring terminals of each pair may be connected to an external switch matrix, which selects between use of the MATE for special services or POTS testing. Because an individual MATE is associated with each central office terminal, with a corresponding MATE at the remote terminal, selective addressing control of the MATE is not required for specials testing. The switching matrix must select only individualized bypass pairs (and their corresponding inhibit lead control) or special services coupling for each MATE, with one MATE dedicated per central office terminal.

The many features and advantages of the present invention will be apparent to one of average skill in the art. The system provides a flexible, modular, and carrier hardware independent solution to the problem of metallic test extension across a digital transmission system. The system improves significantly over prior art alternatives, and specifically prior art metallic emulation technology. All such features and advantages are intended to be within the scope of the present invention as defined by the written description, the figures, and the following claims.

What is claimed is:

1. A metallic access test extension system, comprising:
   an local end unit having a load terminal;
   a remote unit coupled to the local end unit and having a load terminal;
   a voltage controlled current source in the local end unit;
   a shunt admittance coupled between the current source and the load terminal in the local end unit, the admittance having a high impedance at DC and low frequencies; and
   a voltage controlled voltage source in the remote unit;
   wherein the voltage controlled current source is responsive to voltage and current sensed at the remote unit load terminal and the voltage controlled voltage source is responsive to voltages and current sensed at the office unit load terminal.

2. The system of claim 1 wherein the remote unit further includes an impedance coupled in series with the voltage source.

3. The system of claim 1 wherein the local end unit and the remote end unit are coupled via a digital transmission medium, the current source and the voltage source each include an input and an output, each output being coupled to the digital transmission medium.

4. The system of claim 3 wherein the local end unit includes means, coupled to the load terminal thereof, for detecting voltages and currents present at said load terminal and transmitting the voltages and currents to the remote end unit, and the remote unit includes means, coupled to the load terminal thereof, for detecting voltages and currents present at said load terminal and transmitting the voltages and currents to the local end unit.

5. The system of claim 3 wherein the local end unit further includes an anchor circuit, coupled to the voltage controlled current source and the load terminal, for limiting the voltage at the load terminal to a maximum voltage.

6. The system of claim 5 wherein the anchor circuit comprises a variable impedance coupled in parallel with the load terminal, the variable impedance being responsive to a load present at the load terminal.

7. The system of claim 1 wherein a first feedback circuit is coupled to the load terminal of the local end terminal and the remote unit, and a second feedback circuit is coupled to the load terminal of the remote end terminal and the local end unit.

8. The system of claim 7 wherein the first feedback circuit comprises:

a load divider, coupled to the load terminal;

a current shaping circuit, coupled to the load divider and the voltage controlled current source, the current shaping circuit having an output;

a voltage shaping circuit; coupled the second feedback circuit and having an output, and a summing node, coupled to the output of the current shaping circuit and the voltage shaping circuit, and coupled to the remote terminal.

9. The system of claim 8 wherein the load divider comprises three series resistors coupled to the load terminal and ground;

the shunt admittance is coupled to a point between a first and second of said resistors and the input of the voltage controlled current source; and a feedback connector is coupled to a point between the second and a third of said resistors and the input of the voltage controlled current source.

10. The system of claim 7 wherein the second feedback circuit comprises:

a load divider coupled to the load terminal;

the current shaping circuit is coupled to the first feedback circuit and the current shaping circuit includes an output;

a voltage shaping circuit coupled to the load divider and the voltage shaping circuit includes an output; and a summing node, coupled to the outputs of the current shaping circuit and the voltage shaping circuit, and coupled to the local end terminal.

11. The system of claim 10 wherein the load divider comprises three series resistor s coupled to the load terminal and ground, and the current shaping circuit is coupled to an input of the voltage controlled voltage source;

a voltage shaping circuit coupled to a tap between a second and a third of the resistors; and a feedback conductor coupled to a point between the second and a third of said resistors and the input of the voltage controlled current source.

12. The system of claim 3 wherein the system further includes means for adding gain to the output of the voltage source prior to coupling to the digital transmission medium, and means decreasing gain after transmission through the digital transmission medium, the means for increasing and decreasing acting in concert.

13. The system of claim 3 wherein voltages and currents are provided by the local end unit and the remote end unit to the respective input and output thereof, each of the outputs including analog-to-digital conversion means and the inputs including digital-to-analog conversion means, wherein the local end unit and the remote end unit further include means for adding a fixed delay to the analog-to-digital conversion.

14. The system of claim 3 wherein voltages and currents are provided by the local end unit and the remote end unit to the respective input and output thereof, each of the outputs including delta modulation analog-to-digital conversion means and the inputs including delta modulation digital-to-analog conversion means.

15. The system of claim 3 wherein the local end unit and the remote end unit communicate using 56 kbps of bandwidth, wherein the 56 kbps bandwidth comprises 2 kbps of framing, 6 kbps of control code, 24 kbps of tip signal data, and 24 kbps of ring signal data.

16. The system of claim 3 wherein the local end unit and the remote end unit communicate using 56 kbps of bandwidth, wherein the 56 kbps bandwidth comprises 2 kbps of framing, 6 kbps of control code, 24 kbps of metallic signal data, and 24 kbps of longitudinal signal data.

17. The system of claim 3 wherein the local end unit and the remote end unit include a first load terminal and a second load terminal coupled to a tip signal and a ring signal, respectively, and the local end terminal and remote end terminal each include means for summing and subtracting the tip signal and ring signal to provide a metallic and a longitudinal signal to the digital transmission system.

18. The system of claim 1 wherein the shunt admittance comprises an admittance circuit designed to contribute an impedance equal to or grater than an impedance sought by a POTS or special services test system coupled to the local end unit load terminal at a frequency of a load applied by the test system.

19. A metallic access test extension system for use with digital loop carrier, comprising:

an central office local end unit having a first load terminal;

a remote unit coupled to the office unit via a digital transmission system, having a second load terminal;

a first voltage controlled current source in the central office unit;

a shunt admittance circuit coupled between the current source and the load terminal in the local end unit, the admittance having a high impedance at DC and low frequencies; and a second voltage controlled voltage source in the remote unit;

wherein the first voltage controlled current source is responsive to voltage and current sensed at the second remote unit load terminal and the second voltage controlled voltage source is responsive to voltages and current sensed at the first load terminal.

20. The system of claim 19 wherein the remote unit further includes a first admittance coupled in series with the voltage source.

21. The system of claim 19 wherein
the local end unit further includes a third load terminal;
the remote unit further includes a fourth load terminal;
the office unit includes a third voltage controlled current source; and
the remote unit includes a fourth voltage controlled voltage source;
wherein the third voltage controlled current source is responsive to voltage and current sensed at the fourth load terminal and the fourth voltage controlled voltage source is responsive to voltages and current sensed at the third load terminal.

22. The system of claim 21 wherein the system further includes add/subtract circuitry for converting the voltages and current at the first and third, and second and fourth load terminals of the respective local end unit and remote end unit into metallic and longitudinal signals.

23. The system of claim 21 wherein the first and third, and second and fourth current sources and the first and third, and second and fourth voltage sources each include an input and an output coupled to the digital transmission medium.

24. The system of claim 23 wherein the system further includes means for adding gain to the output of the first and second voltage sources and first and second current sources prior to digital transmission medium, and decreasing gain after transmission through the digital transmission medium.

25. The system of claim 21 wherein voltages and currents are provided by the local end unit and the remote end unit to the respective input and output thereof, each of the outputs including analog-to-digital conversion means and the inputs including digital-to-analog conversion means, wherein the local end unit and the remote end unit further include means for adding a fixed delay to the analog-to-digital conversion.

26. The system of claim 21 wherein the local end unit and the remote end unit communicate using 56 kbps of bandwidth, wherein the 56 kbps bandwidth comprises 2 kbps of framing, 6 kbps of control code, 24 kbps of tip signal data, and 24 kbps of ring signal data.

27. The system of claim 1 wherein the shunt admittance comprises an admittance circuit designed to contribute an impedance equal to or grater than an impedance sought by a POTS or special services test system coupled to the local end unit load terminal at a frequency of a load applied by the test system.

28. A metallic test extension system for a telecommunications system, the telecommunications system including at least one tip and ring signal connection at a local end, and a corresponding tip and ring signal connection at a remote end, the metallic test extension system comprising:
an local end unit including
a tip circuit comprising a tip signal connection terminal coupled to a tip voltage controlled current source, and a tip shunt admittance coupled between the connection terminal and the tip voltage controlled current source; and
a ring circuit comprising a ring signal connection terminal coupled to a ring voltage controlled current source, and a ring shunt admittance coupled between the connection terminal and the ring voltage controlled current source; and
a remote unit including
a tip circuit including a tip signal connection terminal coupled to a tip voltage controlled voltage source, and a tip series impedance coupled between the connection terminal and the voltage controlled voltage source; and
a ring circuit including a ring signal connection terminal coupled to a ring voltage controlled voltage source, and a ring series impedance coupled between the connection terminal and the voltage controlled voltage source
wherein each tip and ring voltage controlled current source is responsive to voltage and current sensed at the corresponding tip and ring connection terminal, and each tip and ring voltage controlled voltage source is responsive to voltages and current sensed at the corresponding local end unit tip and ring connection terminal and wherein each shunt admittance has a high impedance at DC.

29. The system of claim 28 wherein the system further includes add/subtract circuitry for converting the tip and ring signals into metallic and longitudinal signals.

30. The system of claim 29 where the voltage sensed at the tip terminal comprises $V_{tip}$ and the voltage sensed at the ring terminal comprises $V_{ring}$, and the metallic signal is defined as:

$$V_{METALLIC} = \frac{V_{TIP} - V_{RING}}{2}.$$

31. The system of claim 29 where the voltage sensed at the tip terminal comprises $V_{tip}$ and the voltage sensed at the ring terminal comprises $V_{ring}$, and the longitudinal signal is defined as:

$$V_{LONGITUDINAL} = \frac{V_{TIP} + V_{RING}}{2}.$$

32. The system of claim 29 wherein the local end unit and the remote end unit are coupled via a digital transmission medium, the current source and the voltage source each include an input and an output coupled to the digital transmission medium.

33. The system of claim 29 wherein the system further includes analog-to-digital conversion means for coupling the tip and ring signal connections to the digital communications system, the analog-to-digital conversion means being coupled to an output of the add/subtract circuitry.

34. The system of claim 33 wherein the system further includes means for adding gain to the output of the voltage source prior to transmission via the digital transmission medium, and decreasing gain after transmission through the digital transmission medium.

35. The system of claim 33 wherein the system further includes means for adding gain to the output of the current source prior to digital transmission medium, and decreasing gain after transmission through the digital transmission medium.

36. The system of claim 1 wherein the s hunt admittance comprises an admittance circuit designed to contribute an impedance equal to or grater than an impedance sought by a POTS or special services test system coupled to the local end unit load terminal at a frequency of a load applied by the test system.

37. The system of claim 33 wherein the local end unit and the remote end unit further include means for adding a fixed delay to the analog-to-digital conversion, and removing the fixed delay from the digital-to-analog conversion.

38. An apparatus for metallic test extension via a digital transmission system, the apparatus comprising:

a connector;

a shunt admittance having a high impedance at low frequencies of a load coupled to the connector;

a current shaping circuit and voltage shaping circuit, coupled to the connector and having summed outputs;

an analog-to-digital converter, coupled to the summed outputs;

a digital-to-analog converter;

an input/output multiplexer coupled to the digital-to-analog converter and the analog-to-digital converter; and a voltage controlled current source coupled to the connector and the digital-to-analog converter.

39. The system of claim 38 wherein the apparatus further includes a remote unit coupled to the digital transmission system, the remote unit including:

a connector;

an input/output multiplexer coupled to the digital transmission system;

a digital-to-analog converter, coupled to the input/output multiplexer;

a first gain circuit coupled to the digital-to-analog converter;

a voltage controlled current source, having an input coupled to the connector and to the first gain circuit, and having an output;

a series impedance coupled to the connector and the output of the voltage controlled current source;

a current shaping circuit and a voltage shaping circuit coupled to the connector and having summed outputs;

a shunt admittance coupled to the connector and the output of the voltage controlled voltage source; and an analog-to-digital converter coupled to the summed outputs and the input/output multiplexer.

40. An apparatus for metallic test extension via a digital transmission system, the apparatus comprising:

a connector;

a shunt admittance having a high impedance at DC and low frequencies of a load coupled to the connector;

a current shaping circuit and voltage shaping circuit, coupled to the connector and having summed outputs;

an analog-to-digital converter, coupled to the summed outputs;

a digital-to-analog converter;

an input/output multiplexer coupled to the digital-to-analog converter and the analog-to-digital converter; and a voltage controlled current source coupled to the connector and the digital-to-analog converter.

41. The system of claim 38 wherein the apparatus further includes a second unit coupled to the digital transmission system, the second unit including:

a connector;

a shunt admittance coupled to the connector;

a current shaping circuit and voltage shaping circuit, coupled to the connector and having summed outputs;

an analog-to-digital converter, coupled to the summed outputs;

a digital-to-analog converter;

an input/output multiplexer coupled to the digital-to-analog converter and the analog-to-digital converter; and a voltage controlled current source coupled to the connector and the digital-to-analog converter.

42. A test extension unit for a digital transmission system, comprising:

a first unit at one end of the digital transmission system including a first terminal, a voltage controlled current source having an output coupled to said terminal and an input, a shunt admittance coupled to the terminal and the output of the voltage controlled current source, a voltage shaping circuit coupled to the terminal and the output of the voltage controlled current source, a current shaping circuit coupled to the input of the voltage controlled current source, analog-to-digital conversion circuitry coupled to the outputs of the voltage shaping circuit and the current shaping circuit, and the digital transmission system, an autorange circuit coupled to the input of the voltage controlled current source, digital-to-analog conversion circuitry coupled to the digital transmission system and the autorange circuit; and a second unit at another end of the digital transmission system including a second terminal, a voltage controlled current source having an input and an output, the output coupled to said second terminal.

digital-to-analog conversion circuitry, a frequency shaping circuit coupled to the digital-to-analog conversion circuitry and the input of the voltage controlled current source, a shunt admittance circuit coupled to the output of the voltage controlled current source and the second terminal;

a voltage shaping circuit coupled to the second terminal and the output of the voltage controlled current source;

a current shaping circuit coupled to the second terminal and the output of the frequency shaping circuit; and an autorange circuit coupled to the outputs of the voltage shaping circuit, and analog-to-digital conversion circuitry coupled to the autorange circuit.

43. A metallic emulation system coupled to a digital transmission system having a first end and a second end, the first end including a first metallic pair connection and the second end including a second metallic pair connection, comprising:

first means, coupled to the first end of the digital transmission system, for generating a current ($I_O$) responsive to a voltage ($V_B$) and current ($I_B$) on the second metallic pair connection indicative of a load coupled to the second metallic pair connection; and second means, coupled to the second end of the digital transmission system, for generating a voltage ($V_O$) responsive to a voltage ($V_A$) and current ($I_A$) on the first metallic pair connection indicative of a load on the first metallic pair connection.

44. The system of claim 43 wherein the first means and second means are coupled by a digital communication channel of the digital transmission system.

45. The system of claim 43 wherein the first means comprises:

a first terminal;

a voltage controlled current source having an output coupled to said terminal and having an input;

a shunt admittance circuit coupled to the terminal and the output of the voltage controlled current source;

a voltage shaping circuit coupled to the terminal and the output of the voltage controlled current source;

a current shaping circuit coupled to the input of the voltage controlled current source;

analog-to-digital conversion circuitry coupled to the outputs of the voltage shaping circuit and the current shaping circuit, and the digital transmission system;

an autorange circuit coupled to the input of the voltage controlled current source; and digital-to-analog conversion circuitry coupled to the digital transmission system and the autorange circuit.

46. The system of claim 43 wherein the second means comprises:

a second terminal;

a voltage controlled current source having an input and an output, the output coupled to said second terminal;

digital-to-analog conversion circuitry;

a frequency shaping circuit coupled to the digital-to-analog conversion circuitry and the input of the voltage controlled current source;

a shunt admittance circuit coupled to the output of the voltage controlled current source and the second terminal;

a voltage shaping circuit coupled to the second terminal and the output of the voltage controlled current source;

a current shaping circuit coupled to the second terminal and the output of the frequency shaping circuit; and an autorange circuit coupled to the outputs of the voltage shaping circuit; and analog-to-digital conversion circuitry coupled to the autorange circuit.

47. The system of claim 44 wherein the first means has an output coupled to the digital transmission system, the second means had an input coupled to the digital transmission system, and wherein the system further includes means for adding gain to the output of the first means prior to transmission by digital transmission medium, and the second means includes means for decreasing gain at the input of the second means.

48. The system of claim 44 wherein the second means has an output coupled to the digital transmission system, the first means had an input coupled to the digital transmission system, and wherein the system further includes means for adding gain to the output of the second means prior to transmission by digital transmission medium, and the first means includes means for decreasing gain at the input of the first means.

49. The system of claim 44 wherein first means and second means each include analog-to-digital conversion means and digital-to-analog conversion means, and said first means and second means further include means for adding a fixed delay to the analog-to-digital conversion means, and removing the fixed delay from the digital-to-analog conversion means.

50. The system of claim 44 wherein the first means and the second means communicate via the digital transmission medium using 56 kbps of bandwidth, wherein the 56 kbps bandwidth comprises 2 kbps of framing, 6 kbps of control code, 24 kbps of tip signal data, and 24 kbps of ring signal data.

* * * * *